(12) United States Patent
Choi et al.

(10) Patent No.: US 10,044,030 B2
(45) Date of Patent: Aug. 7, 2018

(54) COMPOSITE POSITIVE ELECTRODE ACTIVE MATERIAL POSITIVE ELECTRODE INCLUDING THE SAME, AND LITHIUM BATTERY INCLUDING THE POSITIVE ELECTRODE

(71) Applicant: Samsung Electronics Co., Ltd., Suwon-si, Gyeonggi-do (KR)

(72) Inventors: Byungjin Choi, Seoul (KR); Yoonsok Kang, Seongnam-si (KR); Junho Park, Seoul (KR); Jinhwan Park, Seoul (KR); Sungjin Ahn, Anyang-si (KR); Donghee Yeon, Seoul (KR); Jaegu Yoon, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 166 days.

(21) Appl. No.: 14/801,387

(22) Filed: Jul. 16, 2015

(65) Prior Publication Data
US 2016/0020458 A1 Jan. 21, 2016

(30) Foreign Application Priority Data

Jul. 18, 2014 (KR) .................. 10-2014-0091311
Apr. 23, 2015 (KR) .................. 10-2015-0057359

(51) Int. Cl.
| | |
|---|---|
| H01M 4/131 | (2010.01) |
| H01M 4/525 | (2010.01) |
| H01M 10/0525 | (2010.01) |
| H01M 4/36 | (2006.01) |
| H01M 4/505 | (2010.01) |
| H01M 10/052 | (2010.01) |
| H01M 4/02 | (2006.01) |

(52) U.S. Cl.
CPC .......... H01M 4/364 (2013.01); H01M 4/131 (2013.01); H01M 4/505 (2013.01); H01M 4/525 (2013.01); H01M 10/0525 (2013.01); *H01M 4/366* (2013.01); *H01M 10/052* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 7,790,308 B2 | 9/2010 | Johnson et al. | |
| 2006/0051671 A1 | 3/2006 | Thackeray et al. | |
| 2009/0123842 A1* | 5/2009 | Thackeray | C01G 45/1221 429/224 |
| 2011/0076556 A1* | 3/2011 | Karthikeyan | H01M 4/366 429/188 |
| 2013/0078518 A1* | 3/2013 | Thackeray | H01M 4/505 429/221 |
| 2013/0323599 A1* | 12/2013 | Kim | H01M 4/364 429/223 |
| 2015/0180031 A1* | 6/2015 | Thackeray | H01M 4/505 429/149 |
| 2015/0180032 A1* | 6/2015 | Thackeray | H01M 4/505 429/149 |

FOREIGN PATENT DOCUMENTS

| | | |
|---|---|---|
| EP | 1909345 A1 | 4/2008 |
| JP | 4197237 B2 | 10/2008 |
| JP | 2012-146443 A | 8/2012 |
| KR | 10-0943193 B1 | 2/2010 |
| KR | 1020120089845 A | 8/2012 |
| KR | 10-1190185 B1 | 10/2012 |

OTHER PUBLICATIONS

Extended European Search Report for European Patent Application No. 15177322.3 dated Dec. 4, 2015.
Kim et al., "Composite 'Layered-Layered-Spinel' Cathode Structures for Lithium-Ion Batteries", Journal of The Electrochemical Society, 160(1), 2013, pp. A31-A38.
Park et al., "Lithium-manganese-nickel-oxide electrodes with integrated layered-spinel structures for lithium batteries", Electrochemistry Communications, vol. 9, 2007, pp. 262-268.
Korean Office Action for Korean Patent Application No. 10-2015-0057359 dated May 4, 2016; with English Translation.
Liu et al., "Carbon-coated high capacity layered Li[Li0.2Mn0.54Ni0.13Co0.13]O2 cathodes", Electrochemistry Communications, 2010, vol. 12, pp. 750-753.
Taniguchi, I, "Powder properties of partially substituted LiMxMn2—xO4(M=Al, Cr, Fe and Co) synthesized by ultrasonic spray pyrolysis", Materials Chemistry and Physics, 2005, vol. 92, pp. 172-179.
Thackeray et al., "Advances in manganese-oxide 'composite' electrodes for lithium-ion batteries", J. Mater. Chem., 2005, vol. 15, pp. 2257-2267.
Kawai et al., "A novel cathode Li2CoMn3O8 for lithium ion batteries operating over 5 volts", J. Mater. Chem., vol. 8 (4), 1998, pp. 837-839.

* cited by examiner

*Primary Examiner* — Tanisha Diggs
(74) *Attorney, Agent, or Firm* — Cantor Colburn LLP

(57) ABSTRACT

A composite positive electrode active material, the positive electrode active material including: a first metal oxide having a layered structure; and a second metal oxide having a spinel structure, wherein second metal oxide is represented by Formula 1, and wherein the first metal oxide and the second metal oxide form a composite:

$$Li_2M^1{}_{(1+a)}Mn_{(3-a)}O_8 \quad \text{Formula 1}$$

wherein, in Formula 1, $-1<a<1$; and $M^1$ is at least one element selected from Groups 4 to 10, 13, and 14 of the Periodic Table, and wherein $M^1$ is not Mn. Also a positive electrode including the composite positive electrode active material, and a lithium battery including the positive electrode.

20 Claims, 14 Drawing Sheets

COMPOSITE POSITIVE ELECTRODE ACTIVE MATERIAL POSITIVE ELECTRODE INCLUDING THE SAME, AND LITHIUM BATTERY INCLUDING THE POSITIVE ELECTRODE

CROSS REFERENCE TO RELATED APPLICATIONS

This application claims priority to and the benefit of Korean Patent Application No. 10-2014-0091311, filed on Jul. 18, 2014, and Korean Patent Application No. 10-2015-0057359, filed on Apr. 23, 2015, in the Korean Intellectual Property Office, and all the benefits accruing therefrom under 35 U.S.C. § 119, the content of which is incorporated herein in its entirety by reference.

BACKGROUND

1. Field

The present disclosure relates to a composite positive electrode active material, a positive electrode including the same, and a lithium battery including the positive electrode.

2. Description of the Related Art

Lithium batteries are used as power sources for vehicles and portable electronic devices. Accordingly, there is significant interest in improving the capacity of these batteries. Also, as the complexity and functionality of many portable electronic devices has increased, demands for smaller, lighter, and higher-voltage lithium batteries has increased.

In order to manufacture a lithium battery that satisfies these demands, a positive electrode active material with improved lifespan and improved capacity characteristics is needed in order to prevent reduction in the voltage characteristics of the positive electrode active material due to repeated charging and discharging of the lithium battery.

SUMMARY

Provided is a positive electrode active material having a stable structure during repeated charging and discharging of a lithium battery including the positive electrode active material.

Provided is a positive electrode including the positive electrode active material.

Provided is a lithium battery including the positive electrode.

Additional aspects will be set forth in part in the description which follows and, in part, will be apparent from the description.

According to an aspect, a composite positive electrode active material includes a first metal oxide having a layered structure; and a second metal oxide having a spinel phase structure, wherein the second metal oxide is represented by Formula 1, and the first metal oxide and the second metal oxide form a composite:

Formula 1 wherein in Formula 1, $-1<a<1$; and $M^1$ is at least one element selected from Groups 4 to 10, 13, and 14 of the Periodic Table, wherein $M^1$ is not Mn.

According to another aspect, a positive electrode includes the composite positive electrode active material.

According to another aspect, a lithium battery includes the positive electrode.

According to another aspect, a method of preparing the composite positive electrode active material of claim 1 includes: providing a solution including $M^1$ of Formula 1, Mn, and a metal of the first metal oxide; adding to the solution a chelating agent and a precipitating agent to form a precipitate; adding to the precipitate a lithium carbonate to form a mixture; and heat-treating the mixture to prepare the composite positive electrode active material.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
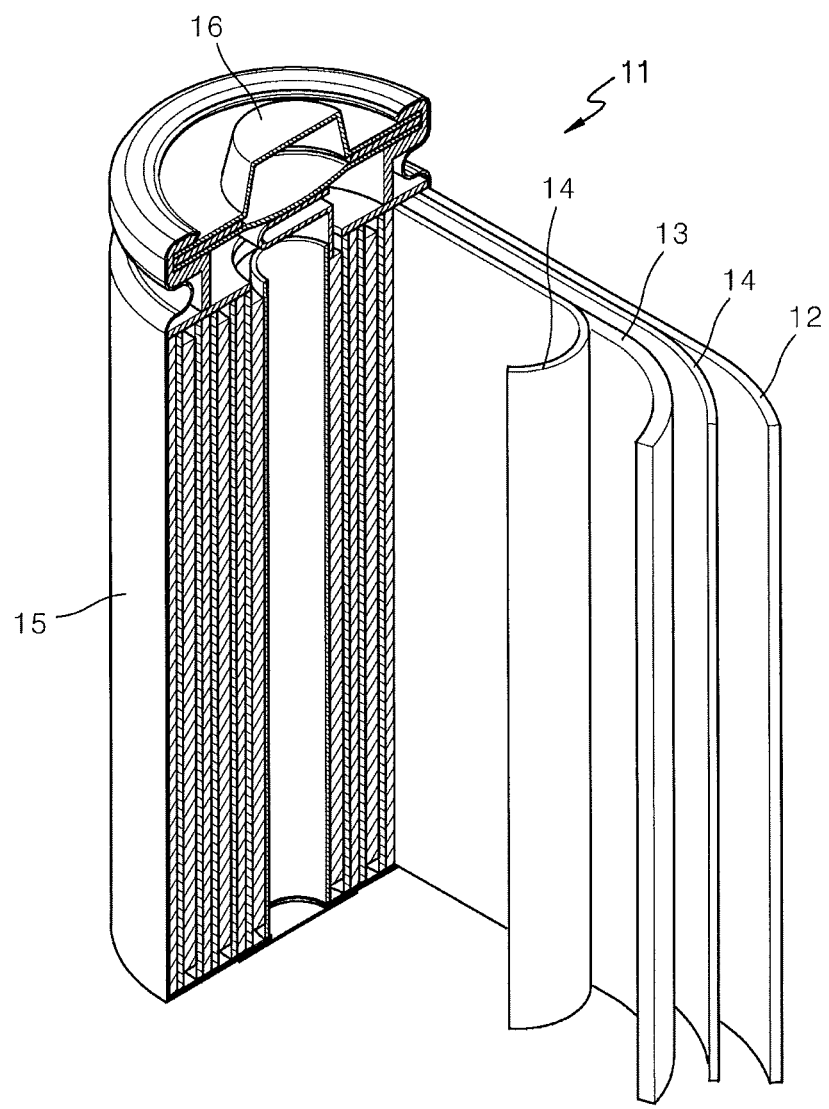
FIG. 1 is an exploded perspective view of an embodiment of a lithium battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Alkali metal" means a metal of Group 1 of the Periodic Table of the Elements, i.e., lithium, sodium, potassium, rubidium, cesium, and francium.

"Alkaline-earth metal" means a metal of Group 2 of the Periodic Table of the Elements, i.e., beryllium, magnesium, calcium, strontium, barium, and radium.

"Transition metal" as defined herein refers to an element of Groups 3 to 11 of the Periodic Table of the Elements.

"Rare earth" means the fifteen lanthanide elements, i.e., atomic numbers 57 to 71, plus scandium and yttrium.

The "lanthanide elements" means the chemical elements with atomic numbers 57 to 71. A C rate means a current which will discharge a battery in one hour, e.g., a C rate for a battery having a discharge capacity of 1.6 ampere-hours would be 1.6 amperes.

"Layered" as would be understood by an artisan in the solid state sciences and as is used herein means that the atomic structure of the material is comprised of layers, e.g., a layer consisting of lithium and a layer comprising metal-centered oxygen octahedra, wherein the layer comprising the metal-centered oxygen octahedra may further comprise an additional element such as lithium.

"Spinel structure" or "spinel phase" as would be understood by an artisan in the solid state sciences and as is used herein means that the compound is isostructural with spinel, i.e., $MgAl_2O_4$.

Hereinafter, a composite positive electrode active material, a method of preparing the composite positive electrode active material, a positive electrode including the composite positive electrode active material, and a lithium battery including the positive electrode will be described in further detail by referring to the accompanying drawings.

A composite positive electrode active material includes a first metal oxide having a layered structure; and a second metal oxide having a spinel structure, wherein the second metal oxide is represented by Formula 1, and the first metal oxide and the second metal oxide form a composite:

$$Li_2M^1_{(1+a)}Mn_{(3-a)}O_8 \qquad \text{Formula 1}$$

In Formula 1, $-1<a<1$, $-0.9<a<0.9$, $-0.8<a<0.8$, $-0.7<a<0.7$, $0<a<0.1$, $0.1<a<0.9$, or $0.2<a<0.8$; and $M^1$ is at least one selected from Groups 4 to 10, 13, and 14 elements, where M' is not manganese (Mn).

In Formula 1, $M^1$ is not Mn and, for example, $M^1$ can be at least one metal selected from V, Cr, Fe, Co, Ni, Zr, Re, Al, B, Ge, Ru, Sn, Ti, Nb, Mo, and Pt. In an embodiment, $M^1$ is at least one metal selected from Groups 9 to 10. Use of cobalt and/or nickel is specifically mentioned.

The first metal oxide having a layered structure is at least one selected from a compound represented by Formula 2 and a compound represented by Formula 3.

$$xLi_2M^2O_3 \cdot yLiMeO_2 \qquad \text{Formula 2}$$

In Formula 2, $x+y=1$, $0<x<1$, $0.1<x<0.9$, $0.2<x<0.8$, $0.3<x<0.7$, $0.35<x<0.65$, or $0.4<x<0.6$, and $0<y<1$, $0.1<y<0.9$, $0.2<y<0.8$, $0.3<y<0.7$, $0.35<y<0.65$, or $0.4<y<0.6$. Also, $M^2$ and Me are each independently at least one element selected from Groups 4 to 10, 13, and 14; at least one element selected from V, Cr, Fe, Co, Ni, Zr, Re, Al, B, Ge, Ru, Sn, Ti, Nb, Mo, and Pt; or at least one element selected from Groups 9 to 10. Use of cobalt and/or nickel is specifically mentioned.

$$Li_pNi_qCo_rMn_sM^3{}_tO_{2-e}M^a{}_e \quad \text{Formula 3}$$

In Formula 3, $1.1 \leq p \leq 1.5$, $0<q<1$, $0\leq r<1$, $0<s<1$, $0\leq t<1$, $0<q+r+s+t<1$, $0\leq e<1$, $M^3$ is at least one selected from Groups 4 to 14 elements, and $M^a$ is an anionic element, such as at least one selected from F, S, Cl, and Br.

In Formula 3, $M^3$ may be at least one selected from gallium (Ga), silicon (Si), tungsten (W), molybdenum (Mo), iron (Fe), chrome (Cr), copper (Cu), zinc (Zn), titanium (Ti), aluminum (Al), and boron (B); at least one selected from Al, Ti, V, Mo, and W; or at least one selected from Al, Ti, V, and W.

The first metal oxide having a layered structure may include a plurality of crystalline phases having different compositions from each other. The plurality of crystalline phases may form a composite.

The first metal oxide may include a crystalline phase that belongs to a C2/m space group (space group 12) and a crystalline phase that belongs to a R$\bar{3}$m space group (space group 166). In an embodiment, the crystalline phase that belongs to a C2/m space group is $Li_2MO_3$, and the layered crystalline phase that belongs to a R$\bar{3}$m space group is $LiMeO_2$.

In an embodiment, the second metal oxide may be intermixed in a layered crystalline phase in a layered structure of the first metal oxide.

In an embodiment, the composite may be a composite positive electrode active material comprising the compounds of Formulas 1 and 2, and may be represented by Formula 4:

$$xLi_2M^2O_3 \cdot yLiMeO_2 \cdot zLi_2M^1{}_{(1+a)}Mn_{(3-a)}O_8 \quad \text{Formula 4}$$

In Formula 4, $x+y+z=1$, $0<x<1$, $0<y<1$, $0<z<1$, and $-1<a<1$; and $M^2$, Me, and $M^1$ are each independently at least one element selected from Groups 4 to 10, 13, and 14, where $M^1$ and $M^2$ are different elements, and can be at least one selected from V, Cr, Fe, Co, Ni, Zr, Re, Al, B, Ge, Ru, Sn, Ti, Nb, Mo, and Pt. Use of manganese, cobalt, and/or nickel is specifically mentioned.

In an embodiment, the composite positive electrode active material is a layered composite comprising the compounds of Formula 2 to which the spinel phase of Formula 1 is introduced.

A lithium transition metal oxide having a layered structure, e.g., $LiMeO_2$, forms an ionic bonding crystal structure that is very compact. Oxygen ions with the largest ionic radius among the elements in the structure form a compact layer and lithium ions and transition metal ions are arranged in spaces between the oxygen ions, thereby increasing a packing density of the lithium transition metal oxide. A transition metal oxide layer of the formula $MeO_2$ comprises the transition metal ions and the oxygen ions in an oxygen octahedral layer covering the lithium ions, which are alternatively arranged. Strong ionic bonding is present within the $MeO_2$ layer, and coulombic repulsion forces are generated between the $MeO_2$ layer and another $MeO_2$ layer, and thus, intercalation and deintercalation of lithium ions in the $MeO_2$ layer is possible. Also, the lithium ions diffuse along a 2-dimensional plane, and while not want to be bound by theory, this structure is understood to provide the high ion conductivity present in the lithium transition metal oxide.

When lithium ions are removed from the crystal structure layer during a charging process, e.g., by deintercalation, the crystals may expand in a c-axis direction due to repulsion between oxygen atoms in the $MeO_2$ layer. Also, when the lithium ions are removed from the crystal structure, the crystals can rapidly contract in a c-axis direction and various changes in a phase of the crystals may occur.

The $Li_2MO_3 \cdot LiMeO$ composite is a material that has been identified as a high capacity positive electrode active material. However, during an initial charging of a battery containing such a material, the material forms a composition of the formula $uLi_2MO_3 \cdot (1-u)MO_2$ ($0<u<1$) due to deintercalation of lithium from $LiMeO_2$ up to 4.4 volts versus lithium (V), and a phase of the formula $(u-\delta)Li_2MO_3 \cdot \delta MnO_2$ ($0<u<1$, $0<\delta<1$, $u+\delta=1$) is formed together with $Li_2O$ at 4.4 V or higher. That is, at a charging voltage of 4.4 V or greater, $Li_2O$ may be formed from $Li_2MnO_3$ due to generation of oxygen when lithium is deintercalated, and production of $MO_2$ may occur as well. This process may be represented by Reaction Scheme 1.

$$Li_2MnO_3 \rightarrow vLi_2O + vMnO_2 + (1-v)Li_2MnO_3 \quad \text{Reaction Scheme 1}$$

In Reaction Scheme 1, $0<v<1$.

As shown in Reaction Scheme 1, unlike a layered $LiMeO_2$, a phase-transition phenomenon occurs from $Li_2MnO_3$ during an initial charging of the battery. In this case, a remaining amount of $Li_2MnO_3$ is determined depending on a cut-off voltage of the charging process, and thus, when a cut-off voltage is increased according to a high capacity of the battery, an amount of $Li_2MnO_3$ is decreased. That is, when a cut-off voltage increases, a remaining amount of $Li_2MnO_3$, which stabilizes the structure, is reduced, and thus a structure of the $Li_2MO_3 \cdot LiMeO_2$ composite becomes unstable.

A discharge reaction, which is a reverse reaction of the reaction of Reaction Scheme 1, may be represented by Reaction Scheme 2.

$$Li + MnO_2 \rightarrow LiMnO_2 \quad \text{Reaction Scheme 2}$$

In consideration of the initial charging and discharging reaction of the battery, and while not wanting to be bound by theory, it is understood that 2 mole (mol) equivalents of lithium with respect to 1 mol equivalent of manganese are deintercalated during the charging of the battery, and 1 mol equivalent of lithium is intercalated back during the discharging of the battery. In this regard, the battery may have a low charging/discharging efficiency, and the lifespan characteristics may be degraded due to the phase transition. Therefore, a positive electrode active material composite that provides a more stable structure under a high voltage is desired.

In the disclosed positive electrode active material composite, $Li_2M^1{}_{(1+a)}Mn_{(3-a)}O_8$ (for example: $Li_2CoMn_3O_8$) of Formula 4 has a spinel structure of a cubic system. Transition metal ions of the layered and spinel-structured positive electrode active material occupy all octahedral sites. In a layered structure, six $MO_6$ octahedral units are 2-dimensionally arranged around one $MO_6$ octahedral unit, whereas in a spinel structure, six $MO_6$ octahedral units are 3-dimensionally arranged around a single $MO_6$ octahedral unit. This difference is caused by different oxidation numbers of the transition metal ions. In a compound having the spinel structure, octahedral planes sharing the faces are 3-dimensionally connected and thus provide a moving pathway for the lithium ions during the charging and discharging of the battery. When a lithium battery includes $Li_2CoMn_3O_8$, the battery may have improved cycle performance in a 4 V region, which is a voltage region lower than that of a lithium battery including $LiMeO_2$. Also, $Li_2CoMn_3O_8$ is relatively inexpensive, manganese reserves are relatively abundant, manganese has relatively low toxicity, and $Li_2CoMn_3O_8$ has almost no heat-release when it decomposes because $MnO_2$ remains even when all lithium is reduced (that is, during the charging of the battery). However, the lithium battery including $Li_2CoMn_3O_8$ has a low density, also a capacity of the $Li_2CoMn_3O_8$ can be reduced when it is exposed to elevated temperatures.

The disclosed composite positive electrode active material comprises phases that are isostructural with $Li_2MO_3$ and $LiMeO_2$, and a large amount of lithium is present in the transition metal layer in a substituted form. In order to use the composite positive electrode active material in a high capacity positive electrode, a positive electrode active material desirably has about 20% or less of lithium in a transition metal layer. However, the positive electrode active material may have a high capacity only when the battery is charged to at least 4.5 V vs. Li/Li+ or higher, and thus, the structural stability of the positive electrode active material at a high voltage is important. For example, when the battery is charged to about 4.4 V or higher, deintercalation of lithium occurs from $Li_2MnO_3$ at the same time as oxygen generation and $MnO_2$ production. In this case, a remaining amount of $Li_2MnO_3$ is determined according to a cut-off voltage, and thus, as a charging voltage is increased, an amount of $Li_2MnO_3$ is reduced, and the structural stability of the positive electrode active material is reduced.

To limit the reduction of the structural stability of the composite positive electrode active material represented by Formula 4, the compound of the formula $Li_2M^1_{(1+a)}Mn_{(3-a)}O_8$, such as spinel structured $Li_2CoMn_3O_8$ having a spinel structure, is introduced in the composite, which comprises a phase having a layered structure comprising $Li_2MnO_3$ and $LiMO_2$, and thus, the structural stability of the positive electrode increases during the charging of the battery at a high voltage. In this regard, the lifespan characteristics and voltage characteristics of the battery may be improved.

In Formulas 2 and 4, $M^2$ and Me are each independently at least one selected from manganese (Mn), vanadium (V), chrome (Cr), iron (Fe), cobalt (Co), nickel (Ni), zirconium (Zr), rhenium (Re), aluminum (Al), boron (B), germanium (Ge), ruthenium (Ru), tin (Sn), titanium (Ti), niobium (Nb), molybdenum (Mo), and platinum (Pt), and, in Formulas 1 and 4, $M^1$ is at least one selected from V, Cr, Fe, Co, Ni, Zr, Re, Al, B, Ge, Ru, Sn, Ti, Nb, Mo, and Pt. $M^2$ and $M^1$ are different.

$M^1$ may be, for example, Co. When $M^1$ in $Li_2M^1_{(1+a)}Mn_{(3-a)}O_8$ is Co, a band gap energy may decrease as a middle band is formed between the band gap, and thus an electrical conductivity of the first metal oxide having a layered structure may improve. Also, the composite positive electrode active material to which Co is introduced may suppress some of manganese of the first metal oxide from being dissolved in an electrolyte and may suppress Jahn Teller distortion, and thus a decrease in a discharge capacity may be prevented and a high voltage stability of the composite positive electrode active may be improved.

When a charging/discharging test is performed on a half-cell battery including a positive electrode containing a positive electrode active material including the composite positive electrode active material according to an embodiment and lithium as a counterelectrode, an average discharge voltage of the half-cell battery during a $50^{th}$ cycle is about 97.5% to about 99.95%, about 98% to about 99.9%, or about 98.5% to about 99.5% of an average discharge voltage during a first cycle. In this regard, it may be confirmed that an average discharge voltage decay in the composite positive electrode active material of Formula 1 is reduced.

In an embodiment, in Formula 4, $0<x\leq0.6$, $0<y\leq0.5$, and $0<z\leq0.05$; and $-0.5\leq a\leq0.5$. In yet another embodiment, in Formula 4, x may be $0.1<x<0.6$, $0.15<x<0.57$, $0.2<x<0.55$, $0.25<x<0.53$, or $0.3<x<0.52$. Also, in Formula 4, y may be $0.1<y<0.45$, $0.15<y<0.40$, or $0.2<y<0.35$. Also, in Formula 4, z may be $0.005<z<0.04$, $0.01<z<0.03$, or $0.015<z<0.02$. Also, a may be $-0.45\leq a\leq0.45$, $-0.4\leq a\leq0.4$, or $-0.35\leq a\leq0.35$. When a charging/discharging test is performed on a half-cell battery including a positive electrode containing a positive electrode active material including the composite positive electrode active material having the composition of Formula 4 and lithium as a counter electrode, an average discharge voltage of the half-cell battery during a $50^{th}$ cycle is about 97.5% to about 99.95%, about 98% to about 99.9%, or about 98.5% to about 99.5%, based on an average discharge voltage during a first cycle. In this regard, when the composite positive electrode active material having the composition of Formula 4 is included in a lithium battery, an effect regarding the average discharge voltage decay of the lithium battery increases.

In some embodiments, in Formula 4, $M^2$ is manganese (Mn) and $M^1$ is at least one metal selected from iron (Fe), cobalt (Co), nickel (Ni), ruthenium (Ru), zirconium (Zr), and titanium (Ti).

In Formula 4, z may be 0.005 to 0.1, for example, 0.005, 0.025, 0.01, 0.05, 0.075, or 0.1.

In Formula 4, Me may be represented by Formula 5.

$$Ni_{1-b-c}Co_bMn_c \qquad \text{Formula 5}$$

In Formula 5, $0<b<0.5$, $0.2<c<0.5$, and $0.2<b+c\leq1$. In an embodiment, b may be $0<b<0.4$, $0.05<b<0.3$, or $0.1<b<0.2$, also, c may be $0.2<c<0.45$, $0.25<c<0.4$, $0.3<c<0.35$.

For example, the compound represented by the Formula 5 may be $Ni_{0.4}Co_{0.2}Mn_{0.4}$, $Ni_{0.5}Co_{0.2}Mn_{0.3}$, $Ni_{0.6}Co_{0.2}Mn_{0.2}$ or $Ni_{1/3}CO_{1/3}Mn_{1/3}$. Also, $Li_2M^1_{(1+a)}Mn_{(3-a)}O_8$ may be, for example, $Li_2Co_{(1+a)}Mn_{(3-a)}O_8$, $Li_2Ni_{(1+a)}Mn_{(3-a)}O_8$, $Li_2Fe_{(1+a)}Mn_{(3-a)}O_8$, or $Li_2Ti_{(1+a)}Mn_{(3-a)}O_8$.

For example, $Li_2M^1_{(1+a)}Mn_{(3-a)}O_8$ may be $Li_2Co_{1.5}Mn_{2.5}O_8$, $Li_2CoMn_3O_8$, $Li_2Ni_{1.5}Mn_{2.5}O_8$, $Li_2NiMn_3O_8$, $Li_2Fe_{1.5}Mn_{2.5}O_8$, $Li_2FeMn_3O_8$, $Li_2TiMn_3O_8$, or $Li_2Ti_{1.5}Mn_{2.6}O_8$.

The composite represented by Formula 4 may be, for example, a compound represented by Formula 6:

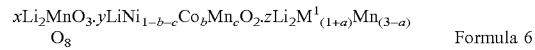

$$xLi_2MnO_3 \cdot yLiNi_{1-b-c}Co_bMn_cO_2 \cdot zLi_2M^1_{(1+a)}Mn_{(3-a)}O_8 \qquad \text{Formula 6}$$

In Formula 6, $M^1$ is at least one metal selected from iron (Fe), cobalt (Co), nickel (Ni), and titanium (Ti); $0<b<0.5$, $0.2<c<0.5$, and $b+c<1$; and $0<x\leq0.6$, $0<y\leq0.5$, $0<z\leq0.1$, and $-0.5\leq a\leq0.5$. In an embodiment, b may be $0.05<b<0.45$, $0.1<b<0.4$, or $0.15<b<0.35$; c may be $0.25<c<0.45$, or $0.3<c<0.4$; x may be $0.1<x<0.6$, $0.2<x<0.5$, $0.25<x<0.55$, or $0.3<x<0.5$, y may be $0.1<y<0.5$, $0.15<y<0.49$, or $0.2<y<0.48$, z may be $0.005<z<0.1$, $0.01<z<0.09$, or $0.02<z<0.8$, and a may be $-0.45<a<0.45$, $-0.4<a<0.4$, $-0.35<a<0.35$, $0<a<0.5$, $0.1<a<0.4$.

In Formula 6, $LiNi_{1-b-c}Co_bMn_cO_2$ may be, for example, $LiNi_{0.4}Co_{0.2}Mn_{0.4}O_2$, $LiNi_{0.5}Co_{0.2}Mn_{0.3}O_2$, or $LiNi_{1/3}Co_{1/3}Mn_{1/3}O_2$.

In an embodiment, the composite represented by Formula 4 may be, for example, a compound represented by Formula 7:

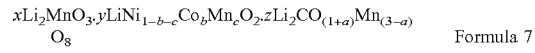

$$xLi_2MnO_3 \cdot yLiNi_{1-b-c}Co_bMn_cO_2 \cdot zLi_2CO_{(1+a)}Mn_{(3-a)}O_8 \qquad \text{Formula 7}$$

In Formula 7, $0<b<1$, $0<c<1$, and $b+c<1$; and $0<x\leq0.6$, $0<y\leq0.5$, $0<z\leq0.1$, and $0\leq a\leq0.5$. In an embodiment, b may be $0.05<b<0.45$, $0.1<b<0.4$, or $0.15<b<0.35$; c may be $0.25<c<0.45$, or $0.3<c<0.4$; x may be $0.1<x<0.6$, $0.2<x<0.5$, $0.25<x<0.55$, or $0.3<x<0.5$, y may be $0.1<y<0.5$, $0.15<y<0.49$, or $0.2<y<0.48$, z may be $0.005<z<0.1$, $0.01<z<0.09$, or $0.02<z<0.8$, and a may be $-0.45<a<0.45$, $-0.4<a<0.4$, $-0.35<a<0.35$, $0<a<0.5$, $0.1<a<0.4$.

The composite represented by Formula 4 may be, for example, $0.545Li_2MnO_3 \cdot 0.45LiNi_{0.4}Co_{0.2}Mn_{0.4}O_2 \cdot 0.005Li_2CoMn_3O_8$;

$0.525Li_2MnO_3 \cdot 0.45LiNi_{0.4}Co_{0.2}Mn_{0.4}O_2 \cdot 0.025Li_2CoMn_3O_8$;

$0.50Li_2MnO_3 \cdot 0.45LiNi_{0.4}Co_{0.2}Mn_{0.4}O_2 \cdot 0.05Li_2CoMn_3O_8$;

$0.54Li_2MnO_3 \cdot 0.45LiNi_{0.4}Co_{0.2}Mn_{0.4}O_2 \cdot 0.01Li_2Co_{1.5}Mn_{2.5}O_8$;

$0.525Li_2MnO_3 \cdot 0.45LiNi_{0.4}Co_{0.2}Mn_{0.4}O_2 \cdot 0.025Li_2Co_{1.5}Mn_{2.5}O_8$;

$0.50Li_2MnO_3 \cdot 0.45LiNi_{0.4}Co_{0.2}Mn_{0.4}O_2 \cdot 0.05Li_2Co_{1.5}Mn_{2.5}O_8$;

$0.45Li_2MnO_3 \cdot 0.45LiNi_{0.4}Co_{0.2}Mn_{0.4}O_2 \cdot 0.1Li_2CoMn_3O_8$;

$0.45Li_2MnO_3 \cdot 0.45LiNi_{0.4}Co_{0.2}Mn_{0.4}O_2 \cdot 0.1Li_2Co_{1.5}Mn_{2.5}O_8$;

$0.475Li_2MnO_3 \cdot 0.45LiNi_{0.4}Co_{0.2}Mn_{0.4}O_2 \cdot 0.075Li_2CoMn_3O_8$; or $0.475Li_2MnO_3 \cdot 0.45LiNi_{0.4}Co_{0.2}Mn_{0.4}O_2 \cdot 0.075Li_2Co_{1.5}Mn_{2.5}O_8$.

In an embodiment, a composition of the composite positive electrode active material may be confirmed by X-ray diffraction (XRD) analysis.

In an embodiment, the composite positive electrode active material of Formula 4 has diffraction peaks within a 2θ value of about 36° to about 37° when analyzed by X-ray powder diffraction (XRD) using Cu—Kα radiation.

Among the diffraction peaks, a first diffraction peak, which appears within a 2θ value of about 36.85° to about 36.95°, corresponds to a (101) face of $LiMeO_2$ (for example: $LiNiCoMnO_2$) having a layered structure, and a second diffraction peak, which appears at a 2θ value of about 36.43° to about 36.50°, corresponds to a (311) face of $Li_2Co_{(1+a)}Mn_{(3-a)}O_8$ having a spinel structure. A mole ratio of a layered phase, e.g., $LiMeO_2$ (for example: $LiNiCoMnO_2$) and a spinel phase, e.g., $Li_2Co_{(1+a)}Mn_{(3-a)}O_8$, in the composite positive electrode active material may be determined from an intensity ratio of the first and second diffraction peaks.

A full width at half maximum (FWHM) of the second diffraction peak may be observed in a range of about 0.070° 2θ to about 0.075° 2θ, for example, in a range of about 0.07026° 2θ to about 0.07344° 2θ. Also, a FWHM of the first diffraction peak may be observed in a range about 0.09° to about 0.13°, for example, in a range of about 0.09033° 2θ to about 0.1224° 2θ. A domain size of the compound of Formula 1, $Li_2M^1_{(1+a)}Mn_{(3-a)}O_8$ having a spinel structure (hereinafter, also referred to as "a spinel phase domain size"), can be greater than a domain size of a layered structure. For example, the spinel phase domain size may be in a range of about 2.0 nanometers (nm) to about 2.4 nm, for example, in a range of about 2.210 nm to about 2.310 nm, about 2.220 nm to about 2.300 nm, or about 2.230 nm to about 2.290 nm. Also, a domain size of $LiMeO_2$ having a layered structure (hereinafter, also referred to as "a layered domain size") may be in a range of about 1.3 nm to about 1.8 nm, for example, in a range of about 1.328 nm to about 1.799 nm, about 1.35 nm to about 1.75 nm, about 1.4 nm to about 1.7 nm, or about 1.45 nm to about 1.65 nm.

A domain size of the layered phase, e.g., $Li_2M^2O_3$, is less than 2.0 nm, e.g., about 0.1 nm to about 1.9 nm, or about 0.2 nm to about 1.8 nm.

The spinel phase domain size and the layered phase domain size may each be calculated by using FWHMs of a peak corresponding to the (311) face of $Li_2Co_{(1+a)}Mn_{(3-a)}O_8$ having a spinel structure and a peak corresponding to the (101) face of $LiMeO_2$ having a layered structure, for example. In particular, a domain size La may be obtained from a FWHM of a diffraction peak by using the Scherrer equation according to Equation 1 below.

$$La=(0.9\lambda)/(\beta \cos \theta) \quad \text{Equation 1}$$

In Equation 1, λ is an X-ray wavelength (e.g., 1.54 Å), and β is a FWHM of a Bragg angle.

An average particle diameter of the composite positive electrode active material may be in a range of about 10 nm to about 500 μm, for example, about 20 nm to about 100 μm, or about 1 μm to about 30 μm. When an average particle diameter of the composite positive electrode active material is within this range, a lithium battery including the composite positive electrode active material may have improved physical properties.

In an embodiment, a tap density of the composite positive electrode active material may be in a range of about 0.5 grams per cubic centimeter ($g/cm^3$) to about 3 $g/cm^3$, about 0.7 $g/cm^3$ to about 2.5 $g/cm^3$, or about 0.1 $g/cm^3$ to about 2 $g/cm^3$. When a tap density of the composite positive electrode active material is within this range, a lithium battery including the composite positive electrode active material may have improved voltage characteristics and lifespan characteristics.

A coating layer may be disposed on a surface of the composite positive electrode active material. In this regard, when an additional coating layer is formed, a lithium battery including a positive electrode containing the composite positive electrode active material may have improved charging and discharging characteristics, lifespan characteristics, and improved high-voltage characteristics.

In an embodiment, the coating layer may include at least one selected from a conductive material, a metal or semimetal oxide, and an inorganic fluoride.

The conductive material may be at least one selected from a carbon-based material, a conductive polymer, ITO, $RuO_2$, and ZnO.

The carbon-based material may comprise at least one selected from crystalline carbon, and amorphous carbon. Examples of the crystalline carbon may include graphite such as natural graphite or artificial graphite in amorphous, disk-shaped, flake, spherical, or fibrous form, and examples of the amorphous carbon may include soft carbon (carbon sintered at low temperature), hard carbon, meso-phase pitch carbides, sintered cokes, graphene, carbon black, fullerene soot, carbon nanotubes, and carbon fibers. Examples of the crystalline carbon and the amorphous carbon are not limited thereto, and any suitable material available in the art may be used as the crystalline carbon or the amorphous carbon.

Examples of the carbon-based material may include carbon nanotubes, fullerene, graphene, and carbon fibers. Also, examples of the conductive polymer may include polyaniline, polythiophene, and polypyrrole. A combination comprising at least one of the foregoing may be used.

The metal or semimetal oxide may comprise at least one selected from silica ($SiO_2$), alumina ($Al_2O_3$), zirconium oxide ($ZrO_2$), and titanium oxide ($TiO_2$).

The inorganic fluoride may comprise at least one selected from $AlF_3$, $CsF$, $KF$, $LiF$, $NaF$, $RbF$, $AgF$, $AgF_2$, $BaF_2$, $CaF_2$, $CuF_2$, $CdF_2$, $FeF_2$, $HgF_2$, $Hg_2F_2$, $MnF_2$, $MgF_2$, $NiF_2$, $PbF_2$, $SnF_2$, $SrF_2$, $XeF_2$, $ZnF_2$, $BF_3$, $BiF_3$, $CeF_3$, $CrF_3$, $DyF_3$, $EuF_3$, $GaF_3$, $GdF_3$, $Fe_{F3}$, $HoF_3$, $InF_3$, $LaF_3$, $LuF_3$, $MnF_3$, $NdF_3$, $VOF_3$, $VF_3$, $PrF_3$, $SbF_3$, $ScF_3$, $SmF_3$, $TbF_3$, $TiF_3$, $TmF_3$, $YF_3$, $YbF_3$, $TlF_3$, $CeF4$, $GeF_4$, $HfF_4$, $SiF_4$, $SnF_4$, $TiF_4$, $VF_4$, $ZrF_4$, $NbF_5$, $SbF_5$, $TaF_5$, $BiF_5$, $MoF_6$, $ReF_6$, $SF_6$, and $WF_6$.

In an embodiment, the coating layer may include a coating element compound, such as an oxide of a coating element, a hydroxide of a coating element, an oxyhydroxide of a coating element, an oxycarbonate of a coating element, or a hydroxycarbonate of a coating element. A compound forming the coating layer may be amorphous or crystalline. A coating element included in the coating layer may comprise at least one selected from Sc, Y, Nb, Cr, Mo, W, Mn, Fe, B, In, C, Sb, La, Ce, Sm, Gd, Mg, Al, Co, K, Na, Ca, Si, Ti, V, Sn, Ge, Ga, B, As, and Zr. A coating layer formation process may be performed using any suitable method using these elements to form the compound, as long as the method (for example, a spray coating method or a dipping method) does not negatively affect the physical properties of the positive electrode active material. Details of such methods are known to those of skill in the art and can be determined without undue experimentation, and thus a further description thereof is omitted for clarity.

In an embodiment, the coating layer may be a continuous layer or a discontinuous layer, for example, an island type layer.

According to another aspect, a method of preparing a composite positive electrode active material is provided.

A method of preparing a composite positive electrode active material is not particularly limited and may be, for example, a co-precipitation method or a solid-phase method.

First, the co-precipitation method will be described hereinafter. When the composite positive electrode active material is prepared using a co-precipitation method, the composite positive electrode active material may have a uniform composition.

One selected from a metal hydroxide represented by Formula 8a, a metal carbonate represented by Formula 8b, and a metal oxalate represented by Formula 8c or Formula 8d may be mixed with a lithium compound to form a mixture, and the mixture may be heat-treated in an air or an oxygen atmosphere at a temperature in a range of about 400° C. to about 1200° C. to obtain a composite positive electrode active material represented by Formula 4.

$$Me^a(OH)_{v1} \quad \text{Formula 8a}$$

In Formula 8a, $Me^a$ is at least one selected from elements of Groups 4 to 10 of the Periodic Table, and v1 is selected based on the valence of $Me^a$, and can be 1 to 5, 1.5 to 4, or 2 to 3, for example.

$$Me^b(CO_3)_{v2} \quad \text{Formula 8b}$$

In Formula 8b, $Me^b$ is at least one selected from elements of Groups 4 to 10 of the Periodic Table, wherein v2 is selected based on the valence of $Me^b$, and can be 1 to 3, such as 1.5 or 2, for example.

$$Me^c(OC(=O)C(=O)O)_{v3} \quad \text{Formula 8c}$$

In Formula 8c, $Me^c$ is at least one selected from elements of Groups 4 to 10 of the Periodic Table, wherein v3 is selected based on the valence of $Me^c$, and can be 1 to 3, such as 1.5 or 2, for example.

$$Me^d(C_2O_4)_{v4} \quad \text{Formula 8d}$$

In Formula 8d, $Me^d$ is at least one selected from elements of Groups 4 to 10 of the Periodic Table, and v4 is selected based on the valence of $Me^d$, and can be 1 to 3, such as 1.5 or 2, for example.

$$xLi_2M^2O_3 \cdot yLiMeO_2 \cdot zLi_2M^1_{(1+a)}Mn_{(3-a)}O_8 \quad \text{Formula 4}$$

In Formula 4, x+y+z=1, 0<x<1, 0<y<1, 0<z<1, and −1<a<1; and $M^2$, Me, and $M^1$ are each independently at least one selected from elements Groups 4 to 10, 13, and 14 of the Periodic Table, wherein $M^1$ and $M^2$ are different elements.

Examples of the lithium compound may include a lithium carbonate ($Li_2CO_3$), a lithium sulfate ($Li_2SO_4$), a lithium nitrate ($LiNO_3$), and a lithium hydroxide (LiOH). The lithium compound is stoichiometrically mixed with a metal compound represented by any of Formulas 8a to 8d to obtain a composition of the composite positive electrode active material represented by Formula 4.

The heat-treatment is performed in air or an oxygen atmosphere at a temperature in a range of about 400° C. to about 1200° C., for example, at about 900° C. A period of time for performing the heat-treatment may vary depending on the temperature for the heat-treatment. For example, the heat-treatment may be performed for about 5 minutes to about 20 hours.

The compounds represented by Formulas 8a to 8d may be obtained from precursor mixtures that are prepared by mixing a $M^2$ precursor, a $M^1$ precursor, a Me precursor, and a Mn precursor with a solvent. Examples of the solvent may include water and an alcohol-based solvent. The alcohol-based solvent may be ethanol.

A content of the solvent may be about 200 parts to about 3000 parts by weight, based on 100 parts by weight of the total content of the $M^2$ precursor, the $M^1$ precursor, the Me precursor, and the Mn precursor. When a content of the solvent is within this range, a mixture including the $M^2$ precursor, the $M^1$ precursor, the Me precursor, and the Mn precursor that are homogenously mixed therein may be obtained. The mixing process of the precursor and the solvent may be performed at a temperature in a range of about 20° C. to about 80° C., for example, at about 60° C.

Examples of the $M^2$ precursor may include an $M^2$ carbonate, an $M^2$ sulfate, an $M^2$ nitrate, and an $M^2$ chloride. Also, examples of the $M^1$ precursor, the Mn precursor, and the Me precursor may be the same as the examples of the $M^2$ precursor, except that each of the examples of the $M^1$ precursor, the Mn precursor, and the Me precursor respectively include $M^1$, Mn, and Me instead of $M^2$.

For example, the $M^2$ precursor may be a manganese precursor. Examples of the manganese precursor may include a manganese sulfate, a manganese nitrate, and a manganese chloride. For example, $M^1$ precursor may be a cobalt precursor. Examples of the cobalt precursor may include a cobalt sulfate, a cobalt nitrate, and a cobalt chloride.

Examples of the Me precursor may include a manganese precursor, a nickel precursor, and a cobalt precursor. The manganese precursor and the cobalt precursor are as described above, and examples of the nickel precursor may include a nickel sulfate, a nickel nitrate, and a nickel chloride.

A chelating agent and a pH adjusting agent may be added to the precursor mixture to provide a co-precipitation reaction to obtain a precipitate. The precipitate thus obtained is filtered and heat-treated. The heat-treatment is performed at a temperature in a range of about 20° C. to about 110° C., for example, at about 80° C. When a temperature of the heat-treatment is within this range, reactivity of the co-precipitation reaction is improved.

While not wanting to be bound by theory, it is understood that the chelating agent serves to control a reaction rate of forming the precipitate. Examples of the chelating agent may include ammonium hydroxide ($NH_4OH$) and citric acid. A content of the chelating agent may be the same as is used in the art, the details of which can be determined by one of skill in the art without undue experimentation.

When sodium hydroxide is used as the pH adjusting agent (e.g., a precipitating agent), a metal hydroxide represented by Formula 8a is obtained. Also, when a sodium carbonate is used as the pH adjusting agent, a metal carbonate represented by Formula 8b is obtained. When a sodium oxalate is used as the pH adjusting agent, a metal oxalate represented by Formula 8c is obtained.

The pH adjusting agent controls a pH of the reaction mixture, which may be selected to be in a range of 6 to 12, and examples of the pH adjusting agent may include an ammonium hydroxide, a sodium hydroxide (NaOH), a sodium carbonate ($Na_2CO_3$), and a sodium oxalate ($Na_2C_2O_4$).

For example, the metal compound represented by Formulas 8a to 8d may be represented by Formula 8e.

$$Ni_{1-b-c}Co_bMn_cX \qquad \text{Formula 8e}$$

In Formula 8e, $0<b<0.5$, $0.2<c<0.5$, and $0.2<b+c\leq 1$; and X is —OH, —$CO_3$, or —$C_2O_4$.

The metal compound represented by Formula 8e may be, for example, $Ni_{0.4}Co_{0.2}Mn_{0.4}(OH)_2$.

Hereinafter, a method of preparing a composite positive electrode active material using a solid-phase method will be further described. In the solid-phase method, the $M^1$, $M^2$, and Mn precursors are mixed to obtain a precursor mixture. The mixing process may be performed by mechanical mixing using, for example, using a ball mill, a Banbury mixer, or a homogenizer. The mechanical mixing may be performed using a zirconia ball.

A period of time for performing the mechanical mixing may vary. For example, the period of time for performing the mechanical mixing may be in a range of about 20 minutes to about 10 hours, for example, 30 minutes to about 3 hours.

A solvent, such as an alcohol, such as ethanol, may be added during the mechanical mixing to increase a mixing efficiency.

A content of the solvent may be in a range of about 100 parts to about 3000 parts by weight, based on 100 parts by weight of the total content of the $M^1$ precursor, the $M^2$ precursor, the Me precursor, and the Mn precursor. When a content of the solvent is within this range, the precursors may be homogenously mixed in the mixture.

Examples of the $M^2$ precursor may include an $M^2$ hydroxide, an $M^2$ oxide, and an $M^2$ carbonate. Also, examples of the $M^1$ precursor and Mn precursor may be the same with the examples of the $M^2$ precursor, except that each of the examples of the $M^1$ precursor and Mn precursor respectively include $M^1$ and Mn instead of $M^2$.

Then, the precursor mixture may be heat-treated at a temperature in a range of about 400° C. to about 1200° C. The precursor mixture may be dried through the heat-treating process.

The resultant thus obtained is mixed with a lithium compound, and then this mixture may be heat-treated to obtain a composite positive electrode active material represented by Formula 4. The lithium compound may be the same material as used in the case of the co-precipitation method. Also, a content of the lithium compound may be selected to obtain the composition of the composite positive electrode active material represented by Formula 4.

The heat-treatment may be performed in an air or an oxygen atmosphere at a temperature in a range of about 400° C. to about 1200° C., for example, about 650° C. to about 900° C.

A period of time for performing the heat-treatment may vary depending on a temperature of the heat-treatment. For example, the heat-treatment may be performed for about 3 hours to about 20 hours.

In an embodiment, the composite positive electrode active material may be prepared using a suitable preparation method such as a spray pyrolysis method as well as the co-precipitation method or the solid-phase method described above.

According to another aspect, a positive electrode includes the composite positive electrode active material.

According to another aspect, a lithium battery includes the positive electrode.

A positive electrode may be prepared according to the following method. A positive electrode active material, a binder, and a solvent may be mixed to prepare a positive electrode active material composition.

A conducing agent may be further added to the positive electrode active material composition.

A metal current collector may be directly coated with the positive electrode active material composition and dried to prepare a positive electrode plate. Alternatively, the positive electrode active material composition may be cast on a separate support, and then a film detached from the support may be laminated on a metal current collector to prepare a positive electrode.

The positive electrode active material may be a composite positive electrode active material as disclosed herein.

A lithium battery may further include a first positive electrode active material, which is a positive electrode active material suitable for a lithium battery, in addition to the composite positive electrode active material.

The first positive electrode active material may be at least one selected from a lithium cobalt oxide, a lithium nickel cobalt manganese oxide, a lithium nickel cobalt aluminum oxide, a lithium iron phosphate, and a lithium manganese oxide, and the first positive electrode active material is not limited thereto, and any suitable positive electrode active material available in the art may be used.

For example, the positive electrode active material may comprise a compound that is represented by at least one of formulas of $Li_aA_{1-b}B'_bD'_2$ (where, $0.90\leq a\leq 1.8$, and $0\leq b\leq 0.5$); $Li_aE_{1-b}B'_bO_{2-c}D'_c$ (where, $0.90\leq a\leq 1.8$, $0\leq b\leq 0.5$, and $0\leq c\leq 0.05$); $LiE_{2-b}B'_bO_{4-c}D'_c$ (where, $0\leq b\leq 0.5$, and $0\leq c\leq 0.05$); $Li_aNi_{1-b-c}Co_bB'_cD'_\alpha$ (where, $0.90\leq a\leq 1.8$, $0\leq b\leq 0.5$, $0\leq c\leq 0.05$, and $0<\alpha\leq 2$); $Li_aNi_{1-b-b}Co_bB'_cO_{2-\alpha}F'_\alpha$ (where, $0.90\leq a\leq 1.8$, $0\leq b\leq 0.5$, $0\leq c\leq 0.05$, and $0<\alpha<2$); $Li_aNi_{1-b-b}Co_bB'_cO_{2-\alpha}F'_\alpha$ (where, $0.90\leq a\leq 1.8$, $0\leq b\leq 0.5$, $0\leq c\leq 0.05$, and $0<\alpha<2$); $Li_aNi_{1-b-c}Mn_bB'_cD'_\alpha$ (where, $0.90\leq a\leq 1.8$, $0\leq b\leq 0.5$, $0\leq c\leq 0.05$, and $0<\alpha\leq 2$); $Li_aNi_{1-b-c}Mn_bB'_cO_{2-\alpha}F'_\alpha$ (where, $0.90\leq a\leq 1.8$, $0\leq b\leq 0.5$, $0\leq c\leq 0.05$, and $0<\alpha<2$); $Li_aNi_{1-b-c}Mn_bB'_cO_{2-\alpha}F'_\alpha$ (where, $0.90\leq a\leq 1.8$, $0\leq b\leq 0.5$, $0\leq c\leq 0.05$, and $0<\alpha<2$); $Li_aNi_bE_cG_dO_2$ (where, $0.90\leq a\leq 1.8$, $0\leq b\leq 0.9$, $0\leq c\leq 0.5$, and $0.001\leq d\leq 0.1$); $Li_aNi_bCo_cMn_dGeO_2$ (where, $0.90\leq a\leq 1.8$, $0\leq b\leq 0.9$, $0\leq c\leq 0.5$, $0\leq d\leq 0.5$, and $0.001\leq e\leq 0.1$); $Li_aNiG_bO_2$ (where, $0.90\leq a\leq 1.8$, and $0.001\leq b\leq 0.1$); $Li_aCoG_bO_2$ (where, $0.90\leq a\leq 1.8$, and $0.001\leq b\leq 0.1$); $Li_aMnG_bO_2$ (where, $0.90\leq a\leq 1.8$, and $0.001\leq b\leq 0.1$); $Li_aMn_2G_bO_4$ (where, $0.90\leq a\leq 1.8$, and $0.001\leq b\leq 0.1$); $QO_2$; $QS_2$; $LiQS_2$; $V_2O_5$;

$LiV_2O_5$; $LiI'O_2$; $LiNiVO_4$; $Li_{(3-f)}J_2(PO_4)_3$ (where, $0 \le f \le 2$); $Li_{(3-f)}Fe_2(PO_4)_3$ (where, $0 \le f \le 2$); and $LiFePO_4$.

In the formulas, A is at least one selected from Ni, Co, and Mn; B' is at least one selected from Al, Ni, Co, Mn, Cr, Fe, Mg, Sr, V, and a rare-earth element; D' is at least one selected from O, F, S, and P; E is at least one selected from Co, and Mn; F' is at least one selected from F, S, and P; G is at least one selected from Al, Cr, Mn, Fe, Mg, La, Ce, Sr, and V; Q is at least one selected from Ti, Mo, and Mn; I' is at least one selected from Cr, V, Fe, Sc, and Y; and J is at least one selected from V, Cr, Mn, Co, Ni, and Cu.

The first positive electrode active material may comprise, for example, a compound represented by Formula 9, a compound represented by Formula 10, or a compound represented by Formula 11:

$$Li_aNi_bCo_cMn_dO_2 \qquad \text{Formula 9}$$

In Formula 9, $0.90 \le a \le 1.8$, $0 \le b \le 0.9$, $0 \le c \le 0.5$, and $0 \le d \le 0.9$.

$$Li_2MnO_3 \qquad \text{Formula 10}$$

$$LiM^3O_2 \qquad \text{Formula 11}$$

In Formula 11, $M^3$ is at least one selected from Mn, Fe, Co, and Ni.

Examples of the conducting agent for the positive electrode active material composition may include at least one selected from carbon black, graphite particles, natural graphite, artificial graphite, acetylene black, Ketjen black, carbon fibers, carbon nanotubes, metal powders, metal fibers, metal tubes comprising copper, nickel, aluminum, and silver; and a conductive polymer such as polyphenylene or a polyphenylene derivative. The conducting agent is not limited to the foregoing examples, and any suitable conducting agent can be used as the conducting agent. A combination comprising at least one of the foregoing may be used.

Examples of the binder may include at least one selected from a vinylidene fluoride/hexafluoropropylene copolymer, polyvinylidene fluoride, polyimide, polyethylene, polyester, polyacrylonitrile, polymethylmethacrylate, polytetrafluoroethylene (PTFE), a carboxymethyl cellulose/styrene-butadiene rubber (CMC/SBR) copolymer, and a styrene butadiene rubber based polymer.

Examples of the solvent may include at least one selected from N-methylpyrrolidone, acetone and water. The solvent is not limited to the foregoing examples, and any suitable solvent can be used as the solvent.

Contents of the composite positive electrode active material, the conducting agent, the binder, and the solvent are as used in the manufacture of a lithium battery. One or more of the conducting agent, the binder, and the solvent may not be omitted if desired.

A negative electrode may be obtained in almost the same manner as in the preparation process of the positive electrode, except that the negative electrode active material is used instead of the positive electrode active material.

Examples of the negative electrode active material may include at least one selected from a carbon-based material, silicon, a silicon oxide, a silicon-based alloy, a silicon-carbon material composite, tin, a tin-based alloy, a tin-carbon composite, and a metal oxide.

The carbon-based material may be a crystalline carbon or an amorphous carbon. A combination thereof may be used. Examples of the crystalline carbon may include graphite such as natural graphite or artificial graphite in amorphous, disk-shaped, flake, spherical, or fibrous form, and examples of the non-shaped carbon may include soft carbon (carbon sintered at low temperature), hard carbon, meso-phase pitch carbonization products, sintered cokes, graphene, carbon black, fullerene soot, carbon nanotubes, and carbon fibers. However, examples of the crystalline carbon and the amorphous carbon are not limited thereto, and any suitable material available in the art may be used as the crystalline carbon or the amorphous carbon.

The negative electrode active material may be selected from Si, SiOx (where, $0<x<2$, for example, $0.5<x<1.5$), Sn, $SnO_2$, a silicon-containing metal alloy, and a mixture thereof. A metal for forming the silicon alloy may be at least one selected from Al, Sn, Ag, Fe, Bi, Mg, Zn, In, Ge, Pb, and Ti.

The negative electrode active material may include a metal/semimetal alloyable with lithium, an alloy thereof, or an oxide thereof. For example, the metal/semimetal alloyable with lithium may be Si, Sn, Al, Ge, Pb, Bi, Sb, a Si—Y alloy (where, Y is an alkali metal, an alkali earth metal, a Group 13 to 16 element, a transition metal, a rare earth element, or a combination thereof except for Si), a Sn—Y alloy (where Y is an alkali metal, an alkali earth metal, a Group 13 to 16 element, a transition metal, a rare earth element, or a combination thereof except for Sn), or MnOx ($0<x \le 2$). Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof. Examples of the oxide of the metal/semimetal alloyable with lithium are a lithium titanium oxide, a vanadium oxide, and a lithium vanadium oxide, $SnO_2$, and SiOx (where, $0<x<2$).

For example, the negative electrode active material may include at least one element selected from an element of Groups 13, 14, and 15 of the Periodic Table.

For example, the negative electrode active material may include at least one element selected from Si, Ge, and Sn.

Contents of the negative electrode active material, the conducting agent, the binder, and the solvent are as generally used in the manufacture of a lithium battery.

A separator may be disposed between the positive electrode and the negative electrode. The separator is an insulating thin film having high ion permeability and mechanical strength.

The separator typically has a pore diameter of about 0.01 μm to about 10 μm and a thickness of about 5 μm to about 20 μm. The separator may be a sheet or non-woven fabric including an olefin-based polymer such as polypropylene, glass fibers, or polyethylene. When a solid polymer electrolyte is used as an electrolyte, the solid polymer electrolyte may also serve as a separator.

Examples of the olefin-based polymer as a material for forming the separator may include at least one selected from polyethylene, polypropylene, polyvinylidene, fluoride, or a multi-layer film having two or more layers. The separator may be a mixed multi-layer such as a two-layer separator of polyethylene/polypropylene, a three-layer separator of polyethylene/polypropylene/polyethylene, or a three-layer separator of polypropylene/polyethylene/polypropylene.

A lithium salt-containing non-aqueous electrolyte including a non-aqueous electrolyte and a lithium salt.

Examples of the non-aqueous electrolyte may include a non-aqueous electrolyte solution, an organic solid electrolyte, and an inorganic solid electrolyte.

The non-aqueous electrolyte solution includes an organic solvent. Any suitable organic solvent available in the art may be used as the organic solvent in the non-aqueous electrolyte solution. Examples of the organic solvent may include at least one selected from propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, N,N-dimethylacetamide, N,N-dimethylsulfoxide, dioxane, 1,2-dimethoxyethane, sulfolane, dichloroethane, chlorobenzene, nitrobenzene, diethyleneglycol, and dimethylether.

Examples of the organic solid electrolyte may include at least one selected from a polyethylene derivative, a polyethylene oxide derivative, a polypropylene oxide derivative, a phosphate ester polymer, poly agitation lysine, polyester sulfide, polyvinyl alcohol, polyvinylidene fluoride, and a polymer including an ionic dissociation group.

Examples of the inorganic solid electrolyte may include at least one selected from a Li nitride, halides, and sulfates such as $Li_3N$, LiI, $Li_5Nl_2$, $Li_3N$—LiI—LiOH, $Li_2SiS_3$, $Li_4SiO_4$, $Li_4SiO_4$—LiI—LiOH, and $Li_3PO_4$—$Li_2S$—$SiS_2$.

The lithium salt is a material that easily dissolves in the non-aqueous electrolyte, and examples of the lithium salt may include at least one selected from $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where, each of x and y is a natural number), LiCl, and LiI. To improve the charging and discharging characteristics and flame retardancy, the non-aqueous electrolyte may further include, for example, at least one selected from pyridine, triethylphosphate, triethanolamine, cyclic ether, ethylenediamine, n-glyme, hexamethyl phosphoamide, a nitrobenzene derivative, sulfur, quinone imine dye, N-substituted oxazolidinone, N,N-substituted imidazolidine, ethyleneglycol dialkylether, ammonium salt, pyrrol, 2-methoxy ethanol, and aluminum trichloride. Optionally, the non-aqueous electrolyte may further include a halogen-containing solvent such as carbon tetrachloride or ethylene trifluoride to provide non-flammability.

As shown in FIG. 1, a lithium battery 11 includes a positive electrode 13, a negative electrode 12, and a separator 14. The positive electrode 13, the negative electrode 12, and the separator 14 are wound or folded, and then accommodated in a battery case 15. Then, the battery case 15 is filled with an organic electrolyte solution and sealed with a cap assembly 16, thereby completing the manufacture of the lithium battery 11. The battery case 15 may be of a cylindrical type, a rectangular type, or a thin-film type battery case. For example, the lithium battery 11 may be a thin-film type battery. The lithium battery 11 may be a lithium ion battery.

The separator 14 may be disposed between the positive electrode 13 and the negative electrode 12 to form a battery assembly. Alternatively, the battery assembly may be stacked in a bi-cell structure and impregnated with the organic electrolyte solution. The resultant is put into a pouch and sealed, thereby completing the manufacture of a lithium ion polymer battery.

Alternatively, a plurality of battery assemblies may be stacked in series to form a battery pack, which may be used in any device that requires high capacity and high output, for example, in a laptop computer, a smart phone, an electric tool, and an electric vehicle.

When charging and discharging test results for a half-cell battery including the positive electrode containing a positive electrode active material including the composite positive electrode active material according to an exemplary embodiment and lithium as a counter electrode are shown via a graph of a voltage (volts (V) vs lithium) versus differential capacity (dQ/dV) obtained by differentiating a charging and discharging capacity by the voltage, the composite has redox peaks showing the presence of the spinel phase within a range of about 2.0 V to about 3.0 V vs lithium during the charging/discharging of the battery.

Also, the lithium battery has excellent high-rate characteristics and lifespan characteristics, and thus may be applicable to an electric vehicle (EV), for example, in a hybrid vehicle such as a plug-in hybrid electric vehicle (PHEV).

The present invention will be described in further detail with reference to the following examples. These examples are for illustrative purposes only and shall limit the scope of the present disclosure.

EXAMPLES

Comparative Preparation Example 1: Preparation of Composite Positive Electrode Active Material A composite positive electrode active material was synthesized using a co-precipitation method which will be described hereafter.

A nickel sulfate, a cobalt sulfate, and a manganese sulfate, as starting materials, were stoichiometrically mixed to obtain a composite positive electrode active material of the formula $0.55Li_2MnO_3 \cdot 0.45LiNi_{0.4}Co_{0.2}Mn_{0.4}O_2$.

The nickel sulfate, the cobalt sulfate, and the manganese sulfate were dissolved in distilled water at a concentration of 2 molar (M) to obtain a precursor mixture. $NH_4OH$, as a chelating agent, and NaOH, as a precipitating agent, were added to the precursor mixture, and a co-precipitation reaction in the mixture was allowed at 60° C. for 4 hours to obtain a precipitate of the formula $(Ni,Co,Mn)(OH)_2$.

The precipitate, $(Ni,Co,Mn)(OH)_2$, thus obtained was washed with distilled water, dried at 80° C. for 24 hours, and mixed with a lithium carbonate. Here, the lithium carbonate was stoichiometrically mixed to obtain the composite positive electrode active material $0.55Li_2MnO_3 \cdot 0.45LiNi_{0.4}Co_{0.2}Mn_{0.4}O_2$.

The mixture was heat-treated in air at 900° C. for 10 hours to obtain the composite positive electrode active material $0.55Li_2MnO_3 \cdot 0.45LiNi_{0.4}Co_{0.2}Mn_{0.4}O_2$.

Comparative Preparation Example 2: Preparation of Positive Electrode Active Material Mixture $0.55Li_2MnO_3 \cdot 0.45LiNi_{0.4}Co_{0.2}Mn_{0.4}O_2$ prepared in Comparative Preparation Example 1 and $Li_2CoMn_3O_8$ were mixed at a molar ratio of 97.5:2.5 to obtain a mixture of $0.55Li_2MnO_3 \cdot 0.45LiNi_{0.4}Co_{0.2}Mn_{0.4}O_2$ and $Li_2CoMn_3O_8$.

Comparative Preparation Example 3: Preparation of Composite Positive Electrode Active Material A composite positive electrode active material of the formula $0.55Li_2MnO_3 \cdot 0.40LiNi_{0.4}Co_{0.2}Mn_{0.4}O_2$–$0.05LiMn_2O_4$ was obtained in the same manner as in Comparative Preparation Example 1, except that amounts of a nickel sulfate, a cobalt sulfate, and a manganese sulfate were changed to stoichiometrically conform to a composition of the composite positive electrode active material.

Preparation Example 1: Preparation of Composite Positive Electrode Active Material A composite positive electrode active material of the formula $0.545Li_2MnO_3 \cdot 0.45LiNi_{0.4}Co_{0.2}Mn_{0.4}O_2 \cdot 0.005Li_2CoMn_3O_8$ was prepared in the same manner as in Comparative Preparation Example 1, except that amounts of a nickel sulfate, a cobalt sulfate, and a manganese sulfate were changed to conform to a composition of 0.5 mole percent (mol %) $Li_2CoMn_3O_8$.

Preparation Example 2: Preparation of Composite Positive Electrode Active Material A composite positive electrode active material of the formula $0.525Li_2MnO_3 \cdot 0.45LiNi_{0.4}Co_{0.2}Mn_{0.4}O_2 \cdot 0.025Li_2CoMn_3O_8$ was prepared in the same manner as in Preparation Example 1, except that amounts of a nickel sulfate, a cobalt sulfate, and a manganese sulfate were changed to conform to a composition of 2.5 mol % $Li_2CoMn_3O_8$.

Preparation Example 3: Preparation of Composite Positive Electrode Active Material A composite positive electrode active material of the formula $0.50Li_2MnO_3 \cdot 0.45LiNi_{0.4}Co_{0.2}Mn_{0.4}O_2 \cdot 0.05Li_2CoMn_3O_8$ was prepared in the same manner as in Preparation Example 1, except that amounts of a nickel sulfate, a cobalt sulfate, and a manganese sulfate were changed to conform to a composition of 5 mol % $Li_2Co_{1.5}Mn_{2.5}O_8$.

Preparation Example 4: Preparation of Composite Positive Electrode Active Material A composite positive electrode active material of the formula $0.54Li_2MnO_3 \cdot 0.45LiNi_{0.4}Co_{0.2}Mn_{0.4}O_2 \cdot 0.01Li_2Co_{1.5}Mn_{2.5}O_8$ was prepared in the same manner as in Preparation Example 1, except that amounts of a nickel sulfate, a cobalt sulfate, and a manganese sulfate were changed to conform to a composition of 1 mol % $Li_2Co_{1.5}Mn_{2.5}O_8$.

Preparation Example 5: Preparation of Composite Positive Electrode Active Material A composite positive electrode active material of the formula $0.525Li_2MnO_3 \cdot 0.45LiNi_{0.4}Co_{0.2}Mn_{0.4}O_2 \cdot 0.025Li_2Co_{1.5}Mn_{2.5}O_8$ was prepared in the same manner as in Preparation Example 1, except that amounts of nickel sulfate, cobalt sulfate, and manganese sulfate were changed to conform to a composition of 2.5 mol % $Li_2Co_{1.5}Mn_{2.5}O_8$.

Preparation Example 6: Preparation of Composite Positive Electrode Active Material A composite positive electrode active material of the formula $0.50Li_2MnO_3 \cdot 0.45LiNi_{0.4}Co_{0.2}Mn_{0.4}O_2 \cdot 0.05Li_2Co_{1.5}Mn_{2.5}O_8$ was prepared in the same manner as in Preparation Example 1, except that amounts of nickel sulfate, cobalt sulfate, and manganese sulfate were changed to conform to a composition of 5 mol % $Li_2Co_{1.5}Mn_{2.5}O_8$.

Preparation Example 7: Preparation of Composite Positive Electrode Active Material A composite positive electrode active material of the formula $0.45Li_2MnO_3 \cdot 0.45LiNi_{0.4}Co_{0.2}Mn_{0.4}O_2 \cdot 0.1Li_2CoMn_3O_8$ was prepared in the same manner as in Preparation Example 1, except that amounts of nickel sulfate, cobalt sulfate, and manganese sulfate were changed to conform to a composition of 10 mol % $Li_2CoMn_3O_8$.

Preparation Example 8: Preparation of Composite Positive Electrode Active Material A composite positive electrode active material of the formula $0.475Li_2MnO_3 \cdot 0.45LiNi_{0.4}Co_{0.2}Mn_{0.4}O_2 \cdot 0.075Li_2CoMn_3O_8$ was prepared in the same manner as in Preparation Example 1, except that amounts of nickel sulfate, cobalt sulfate, and manganese sulfate were changed to conform to a composition of 7.5 mol % $Li_2CoMn_3O_8$.

Preparation Example 9: Preparation of Composite Positive Electrode Active Material A composite positive electrode active material of the formula $0.45Li_2MnO_3 \cdot 0.45LiNi_{0.4}Co_{0.2}Mn_{0.4}O_2 \cdot 0.1Li_2Co_{1.5}Mn_{2.5}O_8$ was prepared in the same manner as in Preparation Example 4, except that amounts of nickel sulfate, cobalt sulfate, and manganese sulfate were changed to conform to a composition of 10 mol % $Li_2Co_{1.5}Mn_{2.5}O_8$.

Preparation Example 10: Preparation of Composite Positive Electrode Active Material A composite positive electrode active material of the formula $0.475Li_2MnO_3 \cdot 0.45LiNi_{0.4}Co_{0.2}Mn_{0.4}O_2 \cdot 0.075Li_2Co_{1.5}Mn_{2.5}O_8$ was prepared in the same manner as in Preparation Example 4, except that amounts of nickel sulfate, cobalt sulfate, and manganese sulfate were changed to conform to a composition of 7.5 mol % $Li_2Co_{1.5}Mn_{2.5}O_8$.

Comparative Example 1

The composite positive electrode active material prepared in Comparative Preparation Example 1, a carbon conducting material (Denka Black), and polyvinylidene fluoride (PVDF), as a binder, were homogenously mixed in a solvent, N-methyl-2-pyrrolidone (NMP), at a weight ratio of 90:5:5 to prepare a slurry.

An aluminum substrate (thickness: 15 μm) was coated with the slurry by using a doctor blade, and the substrate was dried at a reduced pressure at 120° C. and pressed using a roll-press into a sheet, thereby preparing a positive electrode for an electrochemical cell.

In the preparation of the cell, lithium metal was used as a counter electrode, and an electrolytic solution obtained by dissolving 1.3 M $LiPF_6$ into a mixture of ethylene carbonate (EC), ethylmethyl carbonate (EMC) and diethyl carbonate (DEC) having a volume ratio of 3:5:2 was used as an electrolyte.

Comparative Example 2

An electrochemical cell was prepared in the same manner as in Comparative Example 1, except that the composite positive electrode active material mixture prepared in Comparative Preparation Example 2 was used instead of the composite positive electrode active material prepared in Comparative Preparation Example 1.

Comparative Example 3

An electrochemical cell was prepared in the same manner as in Comparative Example 1, except that the positive electrode active material prepared in Comparative Preparation Example 3 was used instead of the composite positive electrode active material prepared in Comparative Preparation Example 1.

Examples 1 to 10

Electrochemical cells were prepared in the same manner as in Comparative Example 1, except that the composite positive electrode active materials prepared in Preparation Examples 1 to 10 were respectively used instead of the composite positive electrode active material prepared in Comparative Preparation Example 1.

Evaluation Example 1: X-Ray Diffraction Analysis

1) Composite positive electrode active materials prepared in Preparation Examples 12, 3, 7, and 8 and composite positive electrode active material prepared in Comparative Preparation Example 1

X-ray diffraction (XRD) analysis was performed on the composite positive electrode active materials prepared in Preparation Examples 2, 3, 7, and 8 and the composite positive electrode active material prepared in Comparative Preparation Example 1.

The XRD analysis was performed by using a diffractometer (Rigaku RINT2200HF+) using Cu—Kα radiation (λ=1.540598 Å).

Figure 2:
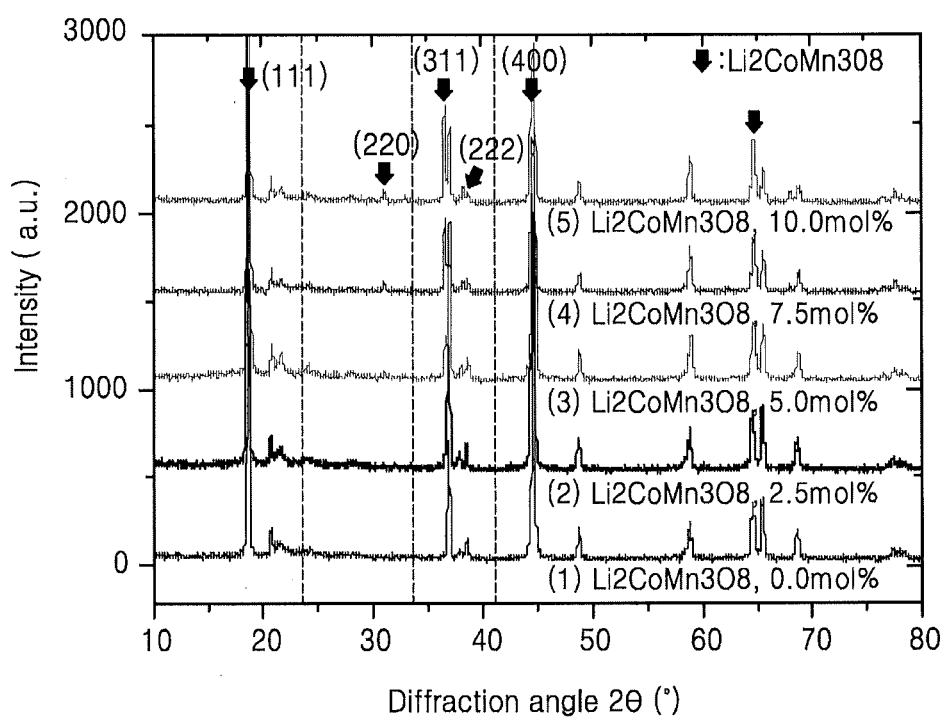
FIGS. 2 to 4 are each a graph of intensity (arbitrary units, a.u.) versus diffraction angle (degrees two-theta, 2θ) and show the results of X-ray diffraction (XRD) analysis of composite positive electrode active materials prepared in Preparation Examples 2, 3, 7, and 8 and a composite positive electrode active material prepared in Comparative Preparation Example 1.
Figure 3:
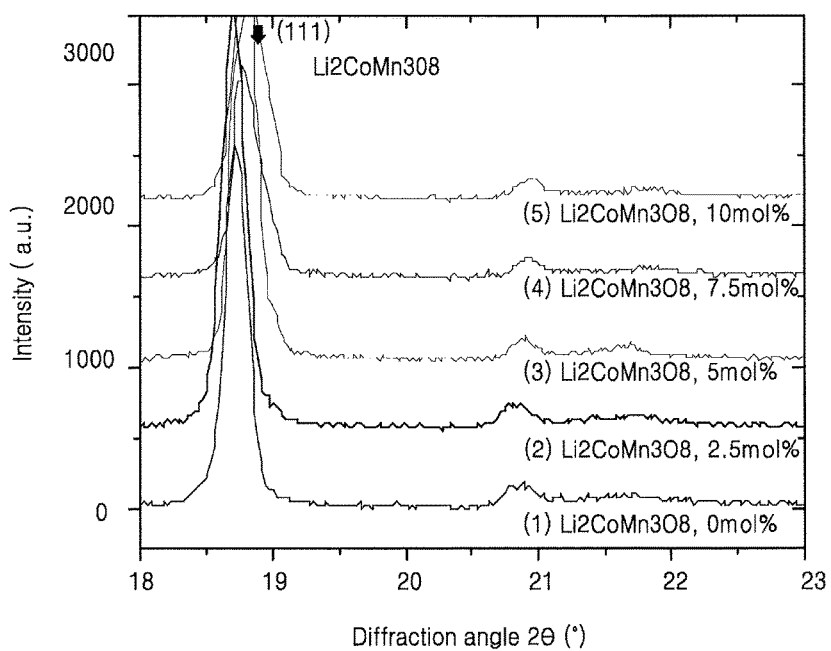
Figure 4:
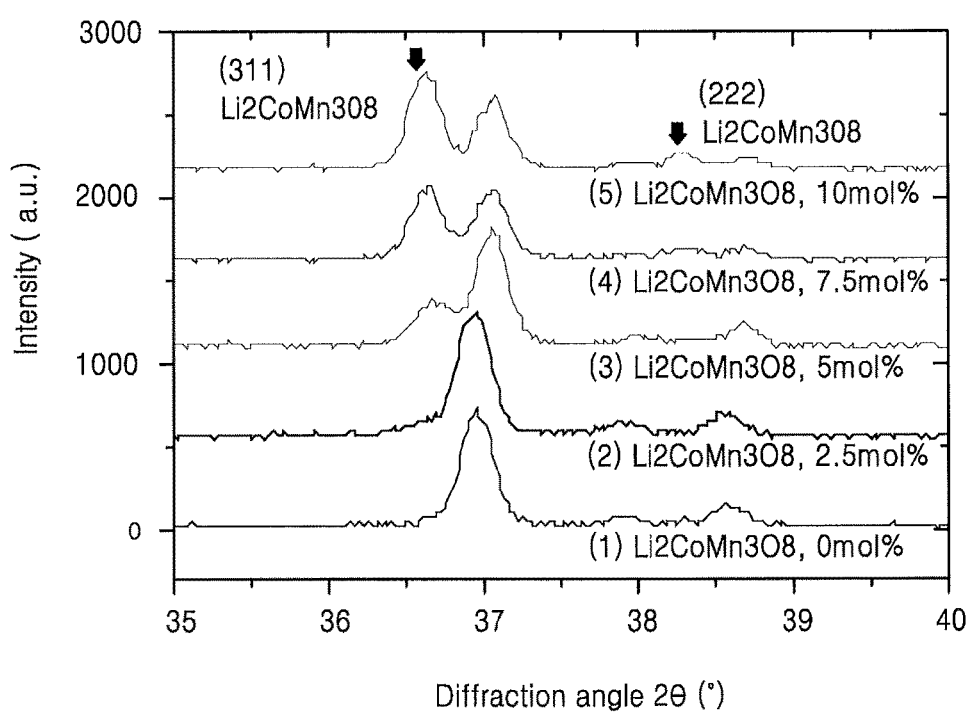

The results of the XRD analysis are shown in FIGS. 2 to 4. FIGS. 2 to 4 show the XRD analysis results for the composites prepared in Preparation Examples 2 and 3, the composites prepared in Preparation Examples 7 and 8, and the composite positive electrode active material prepared in Comparative Preparation Example 1. FIGS. 3 and 4 also show an enlarged view of an area corresponding to a (111) face of $Li_2CoMn_3O_8$ and areas corresponding to (311) and (222) faces of $Li_2CoMn_3O_8$ in FIG. 2.

In FIGS. 2 to 4, a case when $Li_2CoM_{n3}O_8$ is 10.0 mol % refers to Preparation Example 7, a case when $Li_2CoM_{n3}O_8$ is 7.5 mol % refers to Preparation Example 8, a case when $Li_2CoM_{n3}O_8$ is 5.0 mol % refers to Preparation Example 3, a case when $Li_2CoM_{n3}O_8$ is 2.5 mol % refers to Preparation Example 2, and a case when $Li_2CoM_{n3}O_8$ is 0 mol % refers to Comparative Preparation Example 1.

In this regard, the presence of $Li_2CoMn_3O_8$ was confirmed from the composite positive electrode active material prepared in Preparation Examples 2, 3, 7, and 8, unlike the case of the composite positive electrode active material prepared in Comparative Preparation Example 1, and it may be confirmed that the composite positive electrode active materials prepared in Preparation Examples 2, 3, 7, and 8 have a $Li_2MnO_3$—$LiNiCoMnO_2$—$Li_2CoMn_3O_8$ phase. Also, in view of an intensity ratio of a diffraction peak observed at a 2θ value in a range of about 18.5° 2θ to about 19.5° 2θ and a diffraction peak observed at a 2θ value in a range of about 21° 2θ to about 23° 2θ, a mixing ratio of $Li_2MnO_3$ and $Li_2CoMn_3O_8$ was confirmed, and a diffraction peak observed at a 2θ value in a range of about 36° 2θ to about 37° 2θ corresponds to a (311) face of $Li_2CoMn_3O_8$ which appeared at a location different from that of $LiMn_2O_4$ spinel phase.

2) Composite positive electrode active materials prepared in Preparation Examples 3 and 7 and Composite positive electrode active material prepared in Comparative Preparation Example 1 and $Li_2CoMn_3O_8$.

XRD analysis using a Cu—Kα radiation was performed on the composite positive electrode active materials prepared in Preparation Examples 3 and 7 and the composite positive electrode active material prepared in Comparative Preparation Example 1 and $Li_2CoMn_3O_8$.

The XRD analysis was performed by using a diffractometer (Rigaku RINT2200HF+) using Cu—Kα radiation (A=1.540598 Å).

Figure 5A:
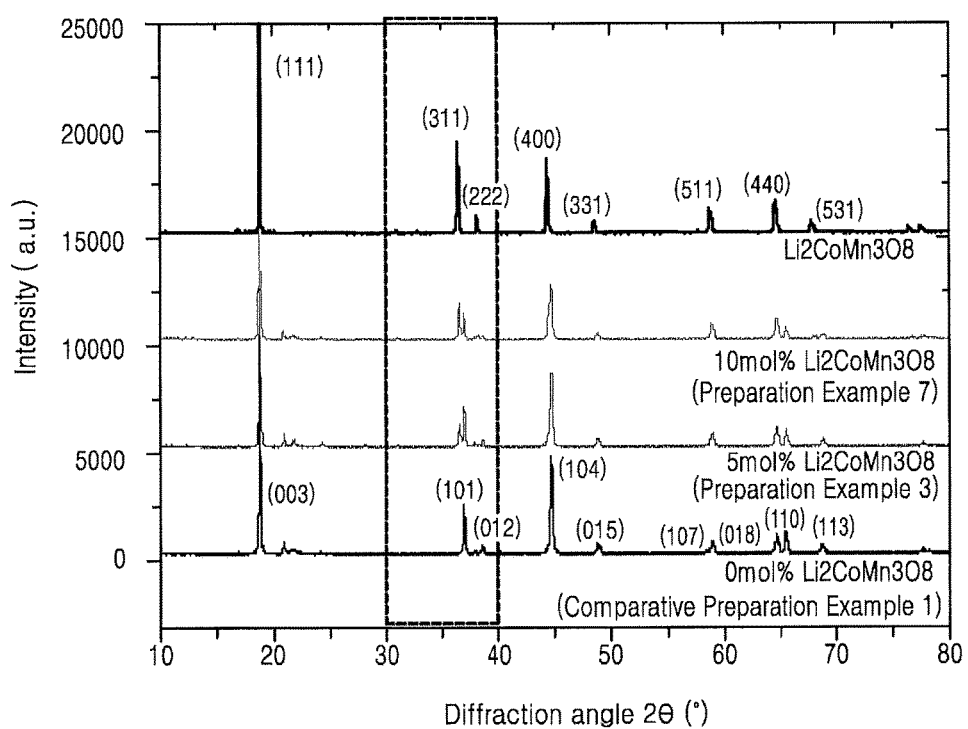
FIG. 5A is a graph of intensity (a.u.) versus diffraction angle (2θ) which shows the results of XRD analysis of composite positive electrode active materials prepared in Preparation Examples 3 and 7 and a composite positive electrode active material prepared in Comparative Preparation Example 1.
Figure 5B:
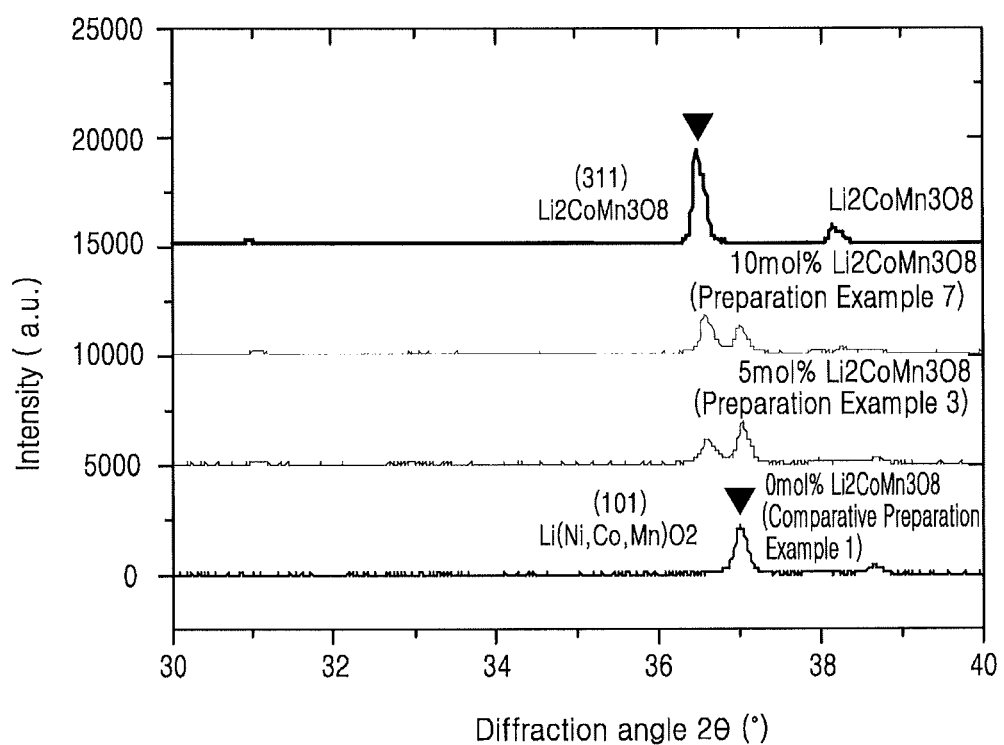
FIG. 5B shows an enlarged view of a portion of FIG. 5A defined by the dot-lined box in FIG. 5A.
Figure 5C:
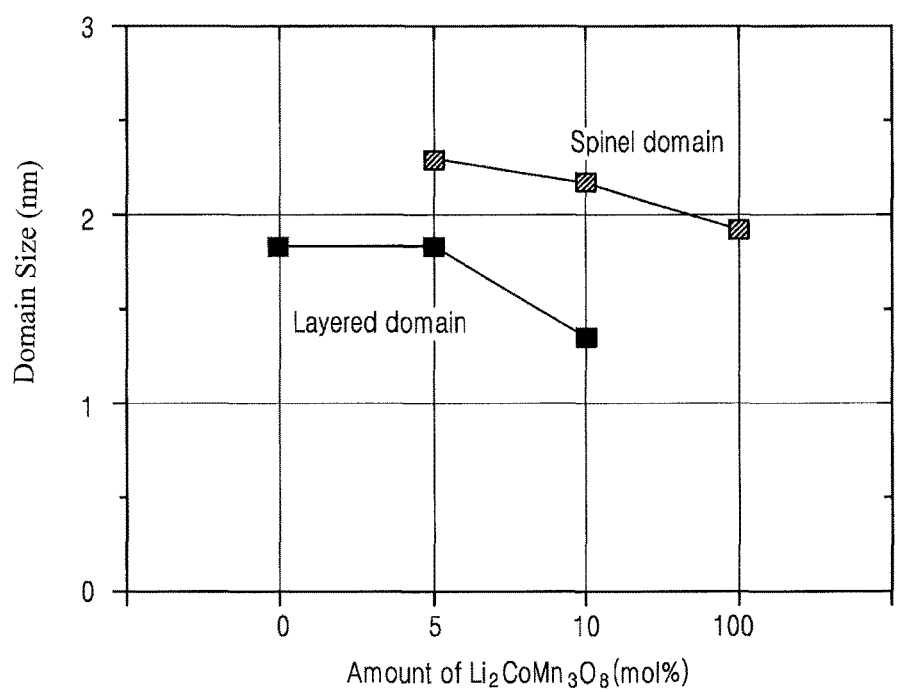
FIG. 5C is a graph of domain size (nanometers, nm) versus content of $Li_2CoMn_3O_8$ (mole percent, mol %) which illustrates changes in a spinel phase domain size and a layered phase domain size according to a content of $Li_2CoMn_3O_8$ in composite positive electrode active materials prepared in Preparation Examples 3 and 7, and the lithium composite oxide prepared in Preparation Comparative Example 1.
Figure 6A:
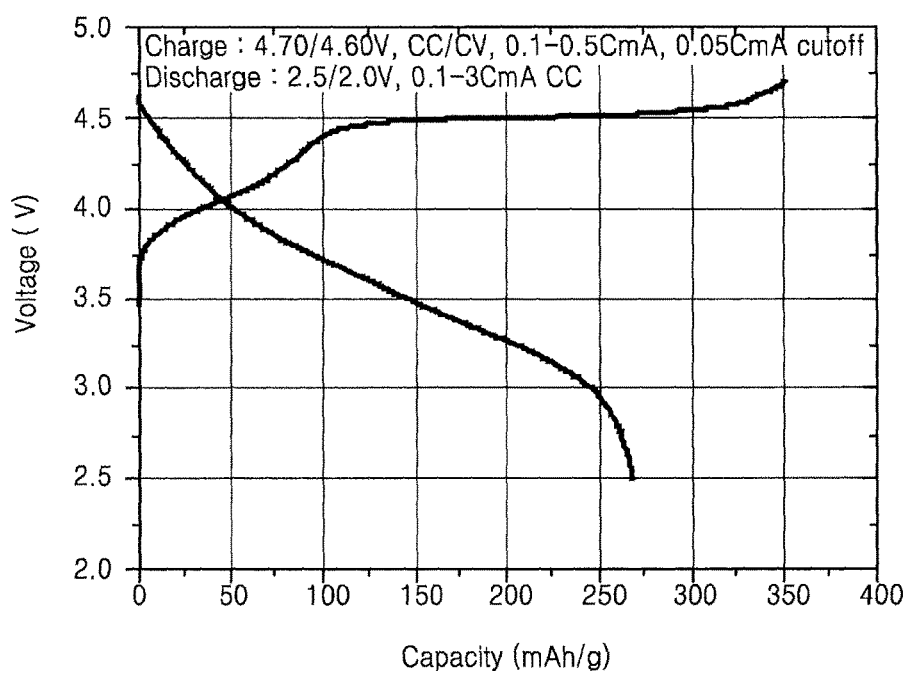
FIGS. 6A to 6F are each a graph of voltage (Volts, V) versus capacity (milliampere-hours per gram, mAh/g) showing charging and discharging profiles of lithium batteries prepared in Examples 1 to 3, 7, and 8 and a lithium battery prepared in Comparative Example 1.
Figure 6B:
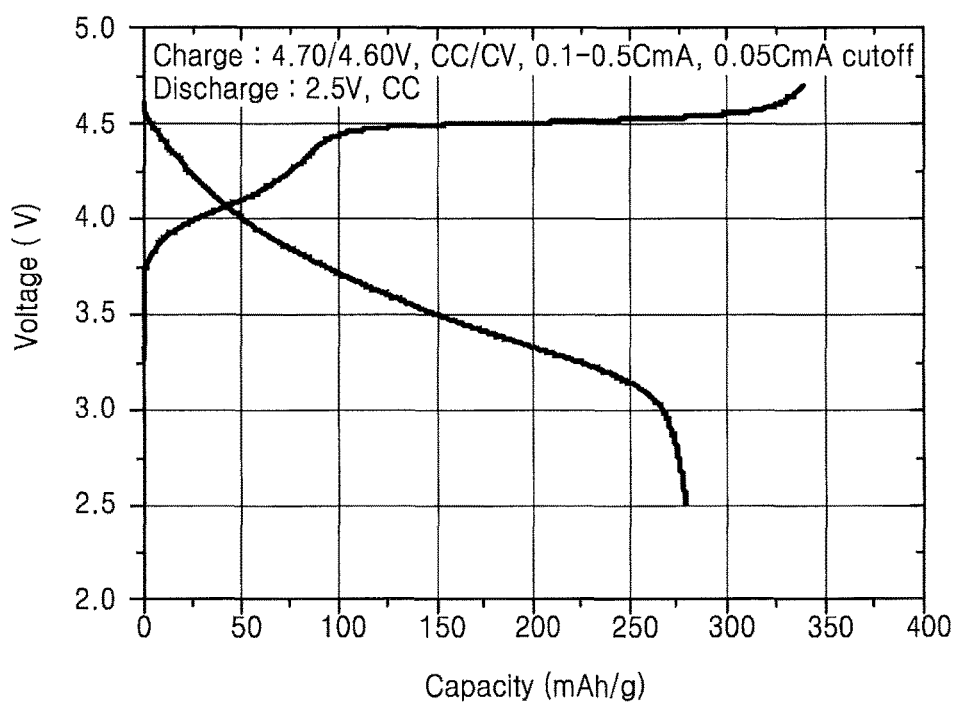
Figure 6C:
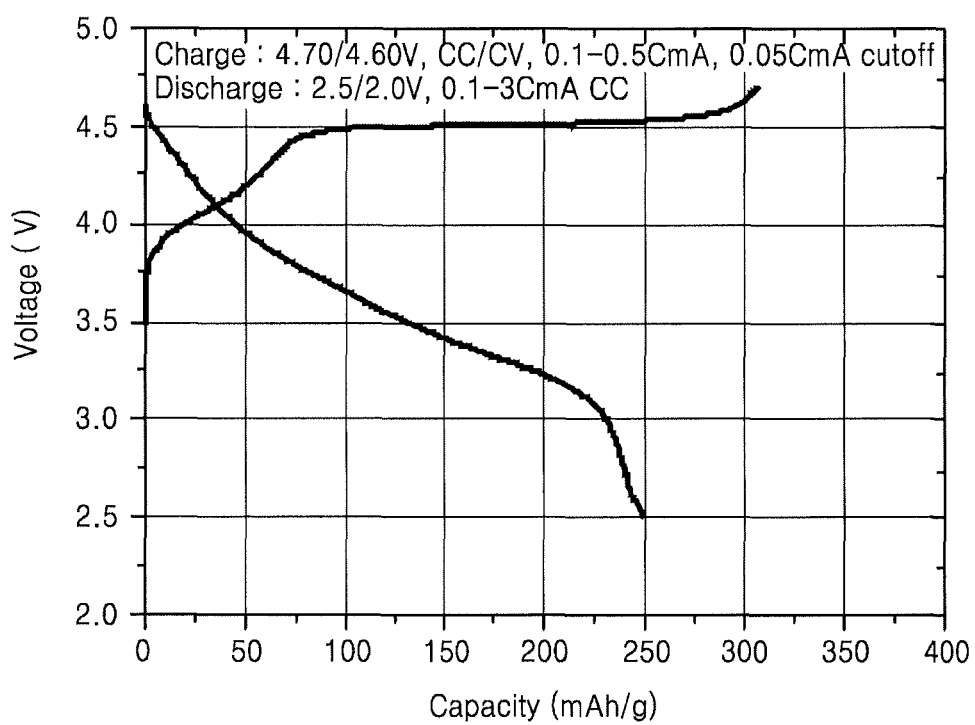
Figure 6D:
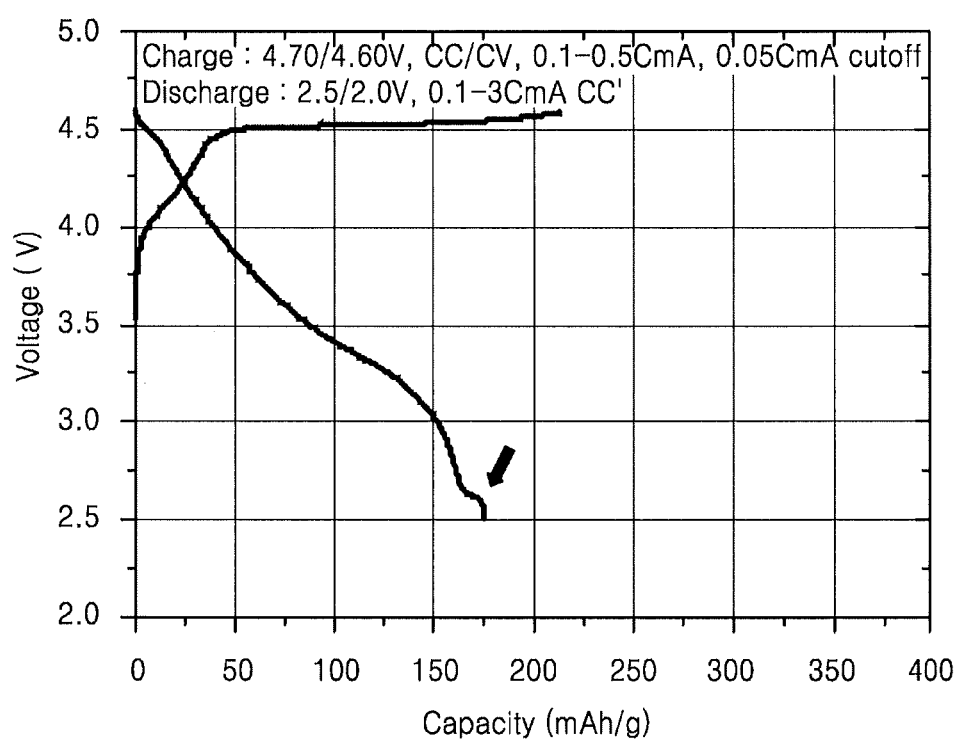
Figure 6E:
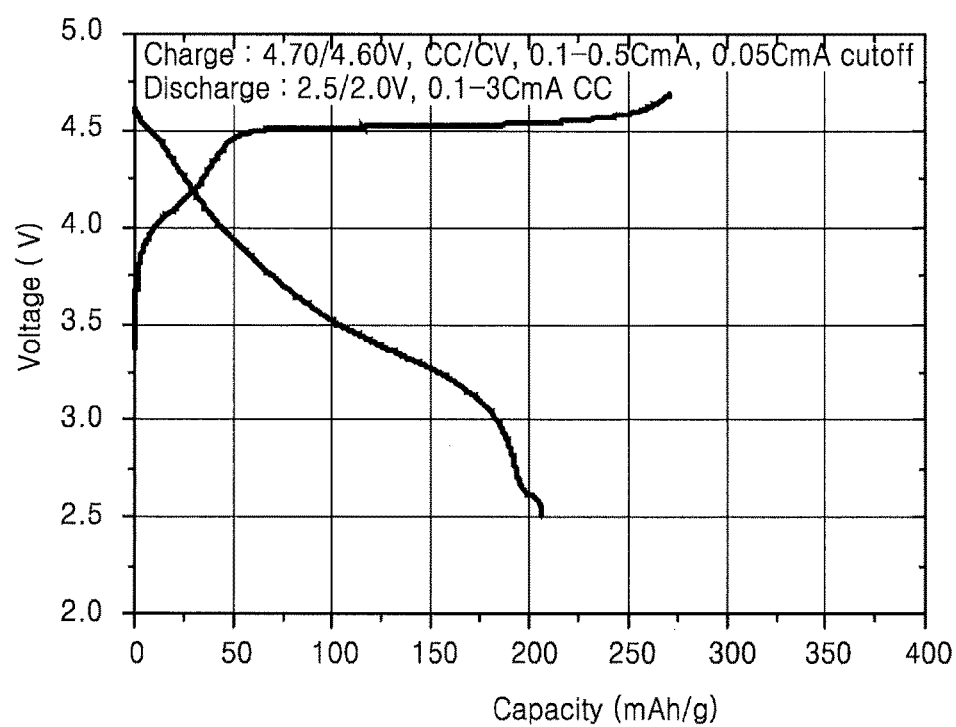
Figure 6F:
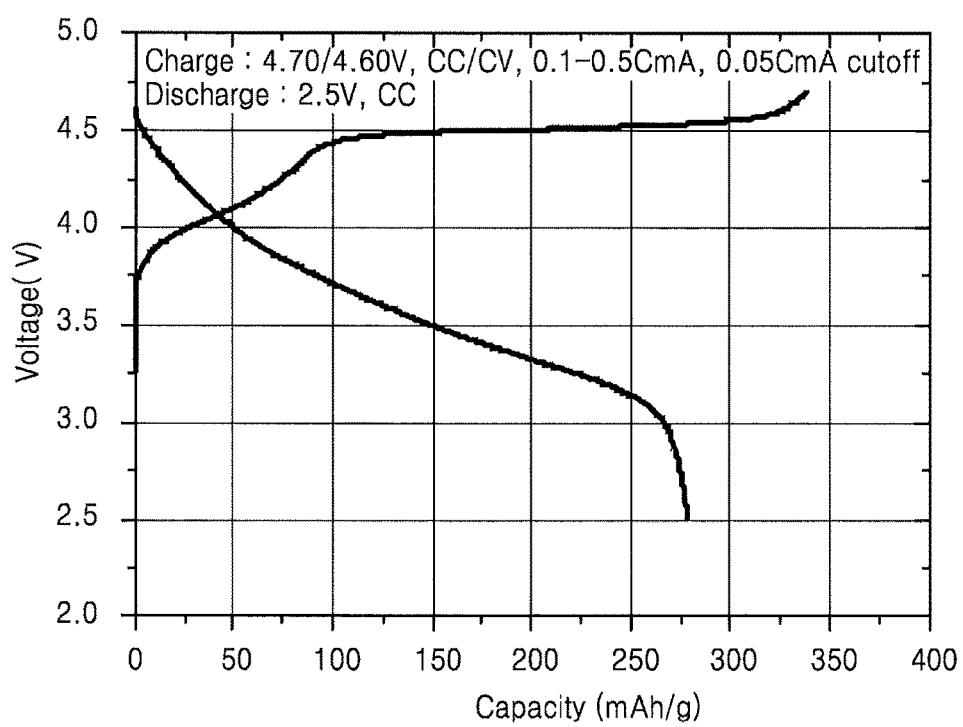

The XRD analysis results are shown in FIGS. 5A to 5C. FIG. 5B is an expanded view of a region defined by the dotted line box in FIG. A, where the 2θ value is in a range of about 30° 2θ to about 40° 2θ.

In FIG. 5A, 2θ and FWHM values were obtained from a diffraction peak corresponding to a (311) face of $Li_2CoMn_3O_8$ having a spinel structure (hereinafter, a second diffraction peak) and a diffraction peak corresponding to a (101) face of $LiNiCoMnO_2$ having a layered structure (hereinafter, a first diffraction peak), and spinel-phase domain sizes and layered-structure domain sizes were calculated by using the 2θ value and FWHM values. The calculated values are shown in Table 1. Also, changes in the spinel-phase domain sizes and layered-structure domain sizes according to an amount of $Li_2CoMn_3O_8$ are shown in FIG. 5C.

TABLE 1

| | Structure and Diffraction peak | 2θ (°) | FWHM (°) | Domain size (nm) |
|---|---|---|---|---|
| $Li_2MnO_3$—$LiNiCoMnO_2$ Comparative Preparation Example 1 (0 mol % $Li_2CoMn_3O_8$) | Layered First Diffraction peak | 36.87125 | 0.09033 | 1.799 |
| | Spinel Second Diffraction peak | — | — | — |
| 5 mol % $Li_2CoMn_3O_8$ Preparation Example 3 | Layered First Diffraction peak | 36.90926 | 0.09033 | 1.799 |
| | Spinel Second Diffraction peak | 36.45173 | 0.07026 | 2.310 |
| 10 mol % $Li_2CoMn_3O_8$ Preparation Example 7 | Layered First Diffraction peak | 36.89431 | 0.1224 | 1.328 |
| | Spinel Second Diffraction peak | 36.43668 | 0.07344 | 2.210 |
| $Li_2CoMn_3O_8$ | Layered First Diffraction peak | — | — | — |
| | Spinel Second Diffraction peak | 36.34444 | 0.08568 | 1.894 |

In view of Table 1 and FIG. 5C, it may be determined that a spinel phase domain size decreases as an amount of the spinel phase increases.

Evaluation Example 2: Charging/Discharging Characteristics

Charging/discharging cycles were performed on the lithium batteries prepared in Examples 1 to 8 and Comparative Examples 1 and 3 at 25° C.

In the first cycle, the lithium batteries prepared in Examples 1 to 8 and Comparative Examples 1 and 3 were each charged at a constant current of 0.1 C until a voltage of the battery was 4.7 V, and then discharged at a constant current of 0.1 C until a voltage of the battery was 2.5 V.

From the second cycle, 4.6V constant current-constant voltage (CC/CV) 0.5 C charging was performed until a current was 0.05 C, and then 2.5V 0.2 C/1 C/2 C discharging was performed on each of the lithium batteries prepared in Examples 1 to 8 and Comparative Examples 1 and 3. Cycle evaluation was performed after 50 cycles of 4.6V CC 1 C charging and 2.5V 1 C discharging.

An initial efficiency, a rate capability, a discharge voltage decay, and a capacity retention rate are each respectively represented by Equations 1 to 4. An initial discharge capacity is defined as a discharge capacity during the first cycle.

Initial efficiency={(first cycle discharge capacity)/(first cycle charge capacity)}×100   Equation 1

Rate capability={(2 C discharge capacity)/(0.2 C discharge capacity)}×100   Equation 2

Discharge voltage decay (mV)=(average discharge voltage during 50th cycle–average discharge voltage during 1st cycle)   Equation 3

An average discharge voltage is a discharge voltage corresponding to a half value of a discharge capacity in each cycle.

Capacity retention rate(%)=(discharge capacity during 50th cycle/discharge capacity during 1st cycle)×100%   Equation 4

Initial efficiencies and rate capabilities of the lithium batteries prepared in Examples 1 to 8 obtained as the results of the charging/discharging characteristics evaluation are shown in Table 2.

TABLE 2

| | First cycle | | | |
|---|---|---|---|---|
| | 0.1 C charging capacity (mAh/g) | 0.1 C discharging capacity (mAh/g) | Initial efficiency (%) | Rate capability 2 C/0.2 C (%) |
| Example 1 | 352 | 268 | 76.2 | 70.5 |
| Example 2 | 332 | 281 | 84.5 | 71.4 |
| Example 3 | 307 | 249 | 81.0 | 74.5 |
| Example 4 | 341 | 277 | 81.1 | 68.3 |
| Example 5 | 337 | 287 | 85.1 | 61.8 |
| Example 6 | 317 | 264 | 83.1 | 76.0 |
| Example 7 | 237 | 178 | 75.0 | — |
| Example 8 | 271 | 206 | 76.1 | — |

As shown in Table 2, the lithium batteries prepared in Examples 1 to 8 had excellent initial efficiencies and rate capabilities.

Also, charging/discharging characteristics of the lithium batteries prepared in Examples 9 and 10 were evaluated, and the results were almost the same with the cases of the lithium batteries prepared in Examples 1 to 8.

Capacity retention rates and discharge voltage decays among the charging/discharging characteristics evaluation results of the lithium batteries prepared in Examples 1 to 6 and Comparative Examples 1 and 3 are shown in Table 3. A discharge voltage decay denotes a difference between a discharge voltage during the $50^{th}$ cycle and a discharge voltage during the $1^{st}$ cycle.

TABLE 3

| | Discharge voltage decay (Δ)(mV) | Average voltage during 50th cycle/ Average voltage during 1st cycle (%) | Capacity retention rate (50th) (%) |
|---|---|---|---|
| Example 1 | −36 | 98.95 | 83.8 |
| Example 2 | −57 | 98.96 | 85.8 |
| Example 3 | −55 | 98.34 | 83.4 |
| Example 4 | −59 | 98.29 | 83.9 |
| Example 5 | −63 | 97.67 | 83.6 |
| Example 6 | −65 | 99.85 | 84.8 |
| Comparative Example 1 | −69 | — | — |
| Comparative Example 3 | −67 | — | 83.3 |

As shown in Table 3, the lithium batteries prepared in Examples 1 to 6 provided improved lifespan characteristics, and, compared to the lithium batteries prepared in Comparative Examples 1 and 3, a voltage decay in the lithium batteries prepared in Examples 1 to 6 reduced due to introduction of $Li_2CoMn_3O_8$ having a spinel phase.

Charging/Discharging Profile

Charging/discharging profiles of the lithium batteries prepared in Examples 1 to 3, 7, and 8 and Comparative Example 1 are shown in FIGS. 6A to 6F.

Charging/discharging conditions included charging at a constant current of about 0.1 C to a voltage of about 4.7 V and discharging at a constant current of about 0.1 C to a voltage of about 2.5 V.

When compared to the lithium battery prepared in Comparative Example 1, the lithium batteries prepared in Examples 1 to 3, 7, and 8 had high initial capacities, less capacity reduction with an increased number of cycles, and even profiles without a steep voltage decay within a range of 2 V to 4.5 V. Also, $Li_2MnO_3$ activation was observed at a plateau of about 4.5 V. Also, a voltage plateau period was observed around about 2.7 V vs lithium during the charging/discharging, which confirmed the presence of the spinel phase.

Figure 7:
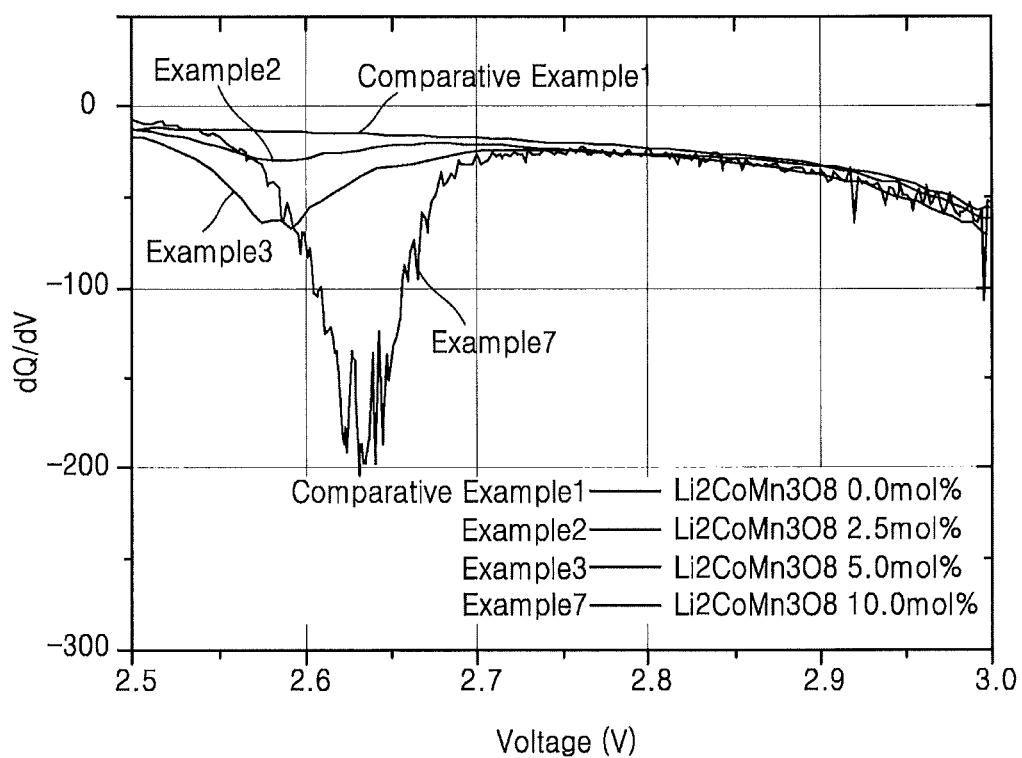
FIG. 7 is a graph of differential capacity (dQ/dV) versus voltage (V) showing the results of analysis of cycle characteristics and voltage decay in lithium batteries prepared in Examples 2, 3, and 7 and Comparative Example 1.

A differentiated charging/discharging curve of the lithium batteries prepared in Examples 2, 3, and 7 and Comparative Example 1 during the $1^{st}$ cycle is shown in FIG. 7.

As shown in FIG. 7, unlike the lithium battery prepared in Comparative Example 1, the lithium batteries prepared in Example 2, 3, and 7 had redox peaks in a range of 2.5 V to 2.7 V.

As described above, according to the one or more of the above embodiments, a composite positive electrode active material has improved structurally stability during a high-voltage charging. If a lithium battery includes a positive electrode including the composite positive electrode active material, the lithium battery may have excellent lifespan characteristics and reduced voltage decay even after repeated charging/discharging.

It should be understood that the exemplary embodiments described therein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A composite positive electrode active material comprising:
a compound represented by the formula $$xLi_2MnO_3 \cdot yLiNi_{1-b-c}Co_bMn_cO_2 \cdot zLi_2Co_{(1+a)}Mn_{(3-a)}O_8$$

wherein,
$0 \leq a \leq 0.5$, $0 \leq b \leq 0.5$, $0.2 < c < 0.5$, $b+c < 1$,
$0 < x \leq 0.6$, $0 < y \leq 0.5$, $0.01 \leq z \leq 0.05$,
the components of the formulas $Li_2MnO_3$ and $LiNi_{1-b-c}Co_bMn_cO_2$ each have a layered structure, and
the component of the formula $Li_2Co_{(1+a)}Mn_{(3-a)}O_8$ has a spinel structure, and
wherein the composite positive electrode active material has a first cycle efficiency of 81% to 85.1% after charging at 0.1 C to 4.7 volts versus lithium.

2. The composite positive electrode active material of claim 1, wherein the component of the formula $Li_2Co_{(1+a)}Mn_{(3-a)}O_8$ intermixed in the layered structure of the components of the formulas $Li_2MnO_3$ and $LiNi_{1-b-c}Co_bMn_cO_2$.

3. The composite positive electrode active material of claim 1, wherein, when a charging/discharging test is performed on a half-cell battery comprising a positive electrode active material comprising the composite positive electrode active material and lithium as a counter metal, an average discharge voltage of the half-cell battery during a $50^{th}$ cycle is about 97.5% to about 99.95% based on an average discharge voltage during a first cycle.

4. The composite positive electrode active material of claim 1, wherein, when a charging/discharging test is performed on a half-cell battery comprising a positive electrode containing the composite positive electrode active material and lithium as a counter electrode, an average discharge voltage of the half-cell battery during a $50^{th}$ cycle is about 97.5% to about 99.95% based on an average discharge voltage during a first cycle.

5. The composite positive electrode active material of claim 1, wherein $Li_2Co_{(1+a)}Mn_{(3-a)}O_8$ is $Li_2Co_{1.5}Mn_{2.5}O_8$ or $Li_2CoMn_3O_8$.

6. The composite positive electrode active material of claim 1, wherein the composite positive electrode active material is at least one selected from
0.525Li$_2$MnO$_3$
0.45LiNi$_{0.4}$Co$_{0.2}$Mn$_{0.4}$O$_2$·0.025Li$_2$CoMn$_3$O$_8$;
0.50Li$_2$MnO$_3$·0.45LiNi$_{0.4}$Co$_{0.2}$Mn$_{0.4}$O$_2$·0.05 Li$_2$CoMn$_3$O$_8$;
0.54Li$_2$MnO$_3$*0.45LiNi$_{0.4}$Co$_{0.2}$Mn$_{0.4}$O$_2$*0.01 Li$_2$Co$_{1.5}$Mn$_{2.5}$O$_8$;
0.525Li$_2$MnO$_3$*0.45LiNi$_{0.4}$Co$_{0.2}$Mn$_{0.4}$O$_2$0.025Li$_2$Co$_{1.5}$Mn$_{2.5}$O$_8$; and
0.50Li$_2$MnO$_3$·0.45LiNi$_{0.4}$Co$_{0.2}$Mn$_{0.4}$O$_2$·0.05Li$_2$Co$_{1.5}$Mn$_{2.5}$O$_8$.

7. The composite positive electrode active material of claim 1, wherein a domain size of a spinel phase structure is greater than a domain size of a layered structure.

8. The composite positive electrode active material of claim 1, wherein a domain size of $Li_2Co_{(1+a)}Mn_{(3-a)}O_8$ having a spinel phase structure is in a range of about 2.0 nanometers to about 2.4 nanometers.

9. The composite positive electrode active material of claim 1, wherein a domain size of the components of the formulas $Li_2MnO_3$ and $LiNi_{1-b-c}Co_bMn_cO_2$ having layered structures are each less than 2.0 nanometers.

10. The composite positive electrode active material of claim 1, wherein, when analyzed by X-ray diffraction using a Cu-Kα radiation, a full width at half maximum of a diffraction peak observed at a 2θ diffraction angle of about 36.43° to about 36.50° is in a range of about 0.070° to about 0.075°.

11. The composite positive electrode active material of claim 1, wherein a coating layer comprising at least one selected from a conductive material, a metal oxide, and an inorganic fluoride is disposed on a surface of the composite positive electrode active material.

12. The composite positive electrode active material of claim 11, wherein the conductive material is at least one selected from a carbon, an indium tin oxide, $RuO_2$, and ZnO.

13. The composite positive electrode active material of claim 11, wherein the metal oxide is at least one selected from silica, alumina, a zirconium oxide, and a titanium oxide.

14. The composite positive electrode active material of claim 11, wherein the inorganic fluoride is at least one selected from AlF$_3$, CsF, KF, LiF, NaF, RbF, TiF, AgF, AgF$_2$, BaF$_2$, CaF$_2$, CuF$_2$, CdF$_2$, FeF$_2$, HgF$_2$, Hg$_2$F$_2$, MnF$_2$, MgF$_2$, NiF$_2$, PbF$_2$, SnF$_2$, SrF$_2$, XeF$_2$, ZnF$_2$, BF$_3$, BiF$_3$, CeF$_3$, CrF$_3$, DyF$_3$, EuF$_3$, GaF$_3$, GdF$_3$, Fe$_{F3}$, HoF$_3$, InF$_3$, LaF$_3$, LuF$_3$, MnF$_3$, NdF$_3$, VOF$_3$, VF$_3$, PrF$_3$, SbF$_3$, ScF$_3$, SmF$_3$, TbF$_3$, TiF$_3$, TmF$_3$, YF$_3$, YbF$_3$, TlF$_3$, CeF4, GeF$_4$, HfF$_4$, SiF$_4$, SnF$_4$, TiF$_4$, VF$_4$, ZrF$_4$, NbF$_5$, SbF$_5$, TaF$_5$, BiF$_5$, MoF$_6$, ReF$_6$, SF$_6$, and WF$_6$.

15. The composite positive electrode active material of claim 1, wherein, when charging/discharging test results of a half-cell comprising a positive electrode active material comprising the composite positive electrode active material according to an exemplary embodiment and lithium as a counter electrode are shown in a graph as a voltage (V, a horizontal axis) vs lithium and a value (dQ/dV, a vertical axis) obtained by differentiating a charging/discharging capacity by the voltage, the composite positive electrode active material has redox peaks showing the presence of a spinel phase structure within a range of about 2.0 V to about 3.0 V during the charging/discharging of the half-cell.

16. The composite positive electrode active material of claim 1, wherein $0.025 \leq z \leq 0.05$.

17. The composite positive electrode active material of claim 1, wherein the composite positive electrode active material has a capacity retention of 83.4% to 85.8% after 50 cycles of charging at 1 C to 4.6 volts versus lithium and discharging at 1 C to 2.5 volts versus lithium.

18. A positive electrode comprising the composite positive electrode active material of claim 1.

19. A lithium battery comprising the positive electrode of claim 18.

20. A method of preparing the composite positive electrode active material of claim 1, the method comprising:
providing a solution comprising Co, Mn, and Ni;
adding to the solution a chelating agent and a precipitating agent to form a precipitate;
adding to the precipitate a lithium carbonate to form a mixture; and heat-treating the mixture to prepare the composite positive electrode active material.

* * * * *